United States Patent
Terakawa et al.

(10) Patent No.: US 11,270,729 B2
(45) Date of Patent: *Mar. 8, 2022

(54) MAGNETIC RECORDING MEDIUM

(71) Applicant: Sony Corporation, Tokyo (JP)

(72) Inventors: Masaru Terakawa, Miyagi (JP); Minoru Yamaga, Miyagi (JP); Katsunori Maeshima, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/617,952

(22) PCT Filed: Apr. 1, 2019

(86) PCT No.: PCT/JP2019/014556
§ 371 (c)(1),
(2) Date: Nov. 27, 2019

(87) PCT Pub. No.: WO2019/189942
PCT Pub. Date: Oct. 3, 2019

(65) Prior Publication Data
US 2021/0020197 A1   Jan. 21, 2021

(30) Foreign Application Priority Data

Mar. 30, 2018 (JP) .............................. JP2018-070356
Nov. 19, 2018 (WO) ................... PCT/JP2018/042738

(51) Int. Cl.
*G11B 5/78* (2006.01)
*G11B 5/70* (2006.01)
(Continued)

(52) U.S. Cl.
CPC ............ *G11B 5/78* (2013.01); *G11B 5/00813* (2013.01); *G11B 5/667* (2013.01); *G11B 5/70* (2013.01);
(Continued)

(58) Field of Classification Search
CPC .. G11B 5/78; G11B 5/584; G11B 5/70; G11B 5/706; G11B 5/733; G11B 5/67;
(Continued)

(56) References Cited

U.S. PATENT DOCUMENTS 5,601,916 A   2/1997   Yamazaki
5,693,397 A   12/1997  Saito
(Continued)

FOREIGN PATENT DOCUMENTS

JP   09-320031       12/1997
JP   2002-298333 A   10/2002
(Continued)

OTHER PUBLICATIONS

Decision on Petition to Grant dated Nov. 12, 2019 in corresponding Japanese Application No. 2019-551405.
(Continued)

*Primary Examiner* — Holly Rickman
(74) *Attorney, Agent, or Firm* — K&L Gates LLP

(57) ABSTRACT

A tape-shaped magnetic recording medium includes a base, a nonmagnetic layer that is provided on the base and contains a nonmagnetic powder, and a magnetic layer that is provided on the nonmagnetic layer and contains a magnetic powder. In the magnetic recording medium, the magnetic layer has an average thickness of not more than 90 nm, the magnetic powder has an average aspect ratio of from 1.0 to 3.0, a coercive force Hc1 in a perpendicular direction is not more than 3,000 Oe, the coercive force Hc1 in the perpendicular direction and a coercive force Hc2 in a longitudinal direction satisfy the relation of Hc2/Hc1≤0.8, the nonmagnetic layer has an average thickness of not more than 1.1 μm, and the nonmagnetic powder has an average particle volume of not more than $2.0 \times 10^{-5}$ μm$^3$.

21 Claims, 7 Drawing Sheets

(51) Int. Cl.
*G11B 5/73* (2006.01)
*G11B 5/008* (2006.01)
*G11B 5/706* (2006.01)
*G11B 5/667* (2006.01)
*G11B 5/708* (2006.01)
*G11B 5/584* (2006.01)
*G11B 20/12* (2006.01)

(52) U.S. Cl.
CPC .......... *G11B 5/708* (2013.01); *G11B 5/70642* (2013.01); *G11B 5/70678* (2013.01); *G11B 5/584* (2013.01); *G11B 5/73919* (2019.05); *G11B 20/1201* (2013.01); *G11B 2020/1281* (2013.01)

(58) Field of Classification Search
CPC ..... G11B 5/70694; G11B 5/667; G11B 5/645; G11B 5/708; G11B 5/679
See application file for complete search history.

(56) References Cited

U.S. PATENT DOCUMENTS

| | | | |
|---|---|---|---|
| 10,665,259 B1 | 5/2020 | Yamaga | |
| 10,748,570 B2 | 8/2020 | Terakawa | |
| 2005/0064243 A1 | 3/2005 | Moriwaki | |
| 2006/0166040 A1* | 7/2006 | Konno | C09C 1/24 428/840.2 |
| 2008/0199733 A1* | 8/2008 | Oka | G11B 5/65 428/810 |
| 2018/0108375 A1 | 4/2018 | Nakashio | |
| 2018/0114541 A1 | 4/2018 | Nakashio | |
| 2018/0182422 A1* | 6/2018 | Kawakami | G11B 5/70642 |
| 2018/0350398 A1* | 12/2018 | Kawakami | G11B 5/68 |
| 2019/0013043 A1 | 1/2019 | Nakashio | |
| 2019/0143637 A1 | 5/2019 | Nakashio | |
| 2019/0228800 A1 | 7/2019 | Muramatsu | |
| 2019/0295584 A1 | 9/2019 | Terakawa | |
| 2020/0118589 A1 | 4/2020 | Terakawa | |
| 2020/0321025 A1 | 10/2020 | Nakashio | |
| 2020/0357434 A1 | 11/2020 | Yamaga | |
| 2020/0357437 A1* | 11/2020 | Yamaga | G11B 5/00813 |

FOREIGN PATENT DOCUMENTS

| | | |
|---|---|---|
| JP | 2002-367150 | 12/2002 |
| JP | 2002-373413 A | 12/2002 |
| JP | 2009-099240 A | 5/2009 |
| JP | 2010-033687 | 2/2010 |
| JP | 2011-096312 | 5/2011 |
| JP | 2017-224365 | 12/2017 |
| WO | 2018/074162 | 4/2018 |
| WO | 2019/160145 | 8/2019 |
| WO | WO-2019160144 A1 | 8/2019 |

OTHER PUBLICATIONS

Notification of Reason for Refusal dated Jan. 28, 2020 in corresponding Japanese Application No. 2019-572764.

* cited by examiner

FIG. 2
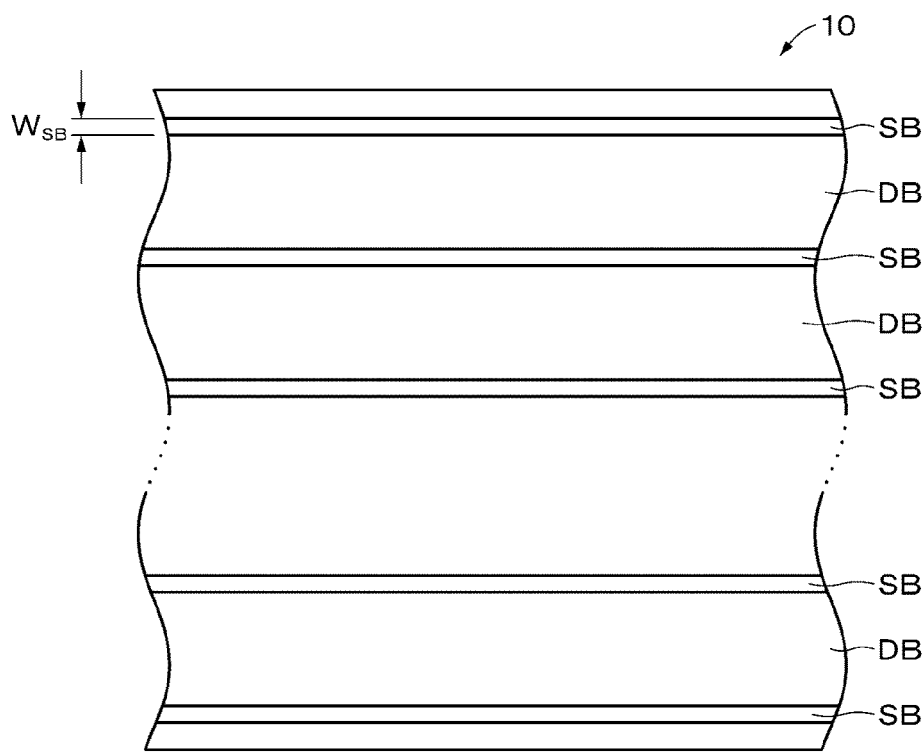
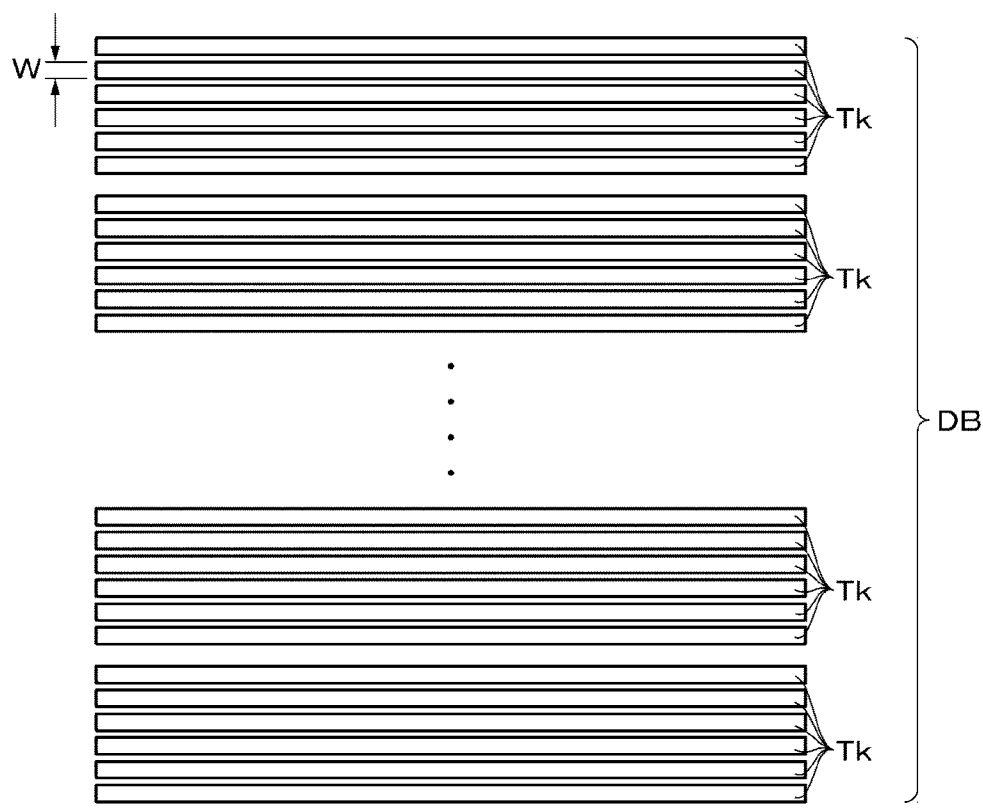

FIG. 9
A
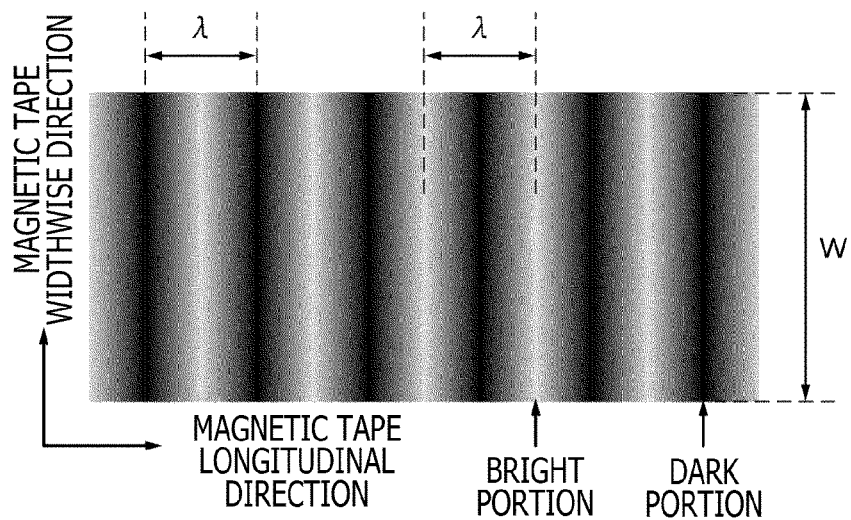
MAGNETIC TAPE LONGITUDINAL DIRECTION
BRIGHT PORTION
DARK PORTION
B
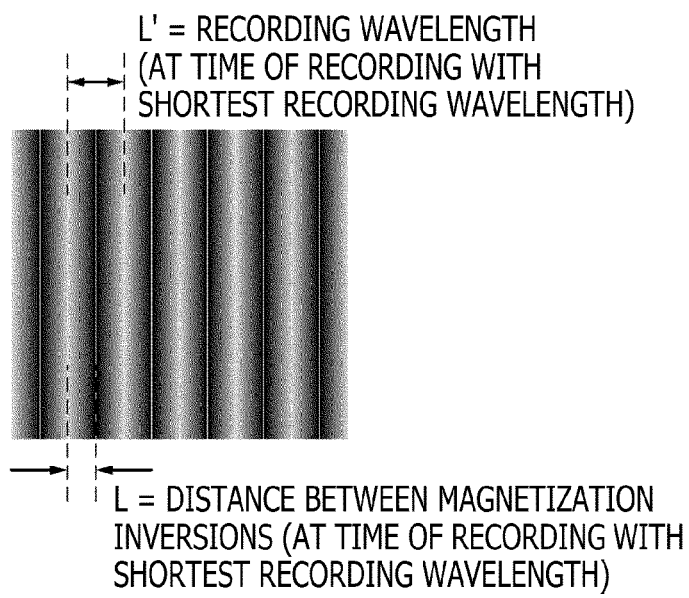
L' = RECORDING WAVELENGTH (AT TIME OF RECORDING WITH SHORTEST RECORDING WAVELENGTH)
L = DISTANCE BETWEEN MAGNETIZATION INVERSIONS (AT TIME OF RECORDING WITH SHORTEST RECORDING WAVELENGTH)

MAGNETIC RECORDING MEDIUM

TECHNICAL FIELD

The present disclosure relates to a magnetic recording medium.

BACKGROUND ART

In recent years, as one of data storage media, a tape-shaped magnetic recording medium has been paid attention to. In regard of the magnetic recording medium, various characteristic enhancements have been investigated, one of which is enhancement of electromagnetic conversion characteristics.

PTL 1 to PTL 3 propose technologies for enhancing dispersibility of a barium ferrite magnetic powder to thereby enhance electromagnetic conversion characteristics.

CITATION LIST

Patent Literature

PTL 1

JP 2002-298333A

PTL 2

JP 2002-373413A

PTL 3

JP 2009-99240A

SUMMARY

Technical Problem

It is an object of the present disclosure to provide a magnetic recording medium with which electromagnetic conversion characteristics can be enhanced.

Solution to Problem

In order to solve the above problem, the present disclosure provides
a tape-shaped magnetic recording medium, including:
a base;
a nonmagnetic layer that is provided on the base and contains a nonmagnetic powder; and
a magnetic layer that is provided on the nonmagnetic layer and contains a magnetic powder,
in which the magnetic layer has an average thickness of not more than 90 nm,
the magnetic powder has an aspect ratio of from 1.0 to 3.0,
a coercive force Hc1 in a perpendicular direction is not more than 3,000 Oe,
the coercive force in the perpendicular direction and a coercive force Hc2 in a longitudinal direction satisfy a relation of Hc2/Hc1≤0.8,
the nonmagnetic layer has an average thickness of not more than 1.1 μm, and
the nonmagnetic powder has an average particle volume of not more than $2.0 \times 10^{-5}$ μm$^3$.

Advantageous Effect of Invention

According to the present disclosure, electromagnetic conversion characteristics can be enhanced. Note that the effect described here is not necessarily limitative, and the effect of the present disclosure may be the same effects as described in the present disclosure or an effect different from them.

BRIEF DESCRIPTION OF DRAWINGS

FIG. 2A is a schematic view of layout of data bands and servo bands. FIG. 2B is an enlarged view of the data bands.

FIG. 9A depicts an MFM image in the case where data signals are recorded with a wavelength λ. FIG. 9B denotes an MFM image in the case where data signals are recorded with a shortest recording wavelength L'.

DESCRIPTION OF EMBODIMENTS

Embodiments of the present disclosure will be described in the following order.

1 First Embodiment
1.1 Configuration of Magnetic Recording Medium
1.2 Manufacturing Method for Magnetic Recording Medium
1.3 Configuration of Recording and Reproducing Apparatus
1.4 Effects
1.5 Modifications
2 Second Embodiment

1 First Embodiment

1.1 Configuration of Magnetic Recording Medium

Figure 1:
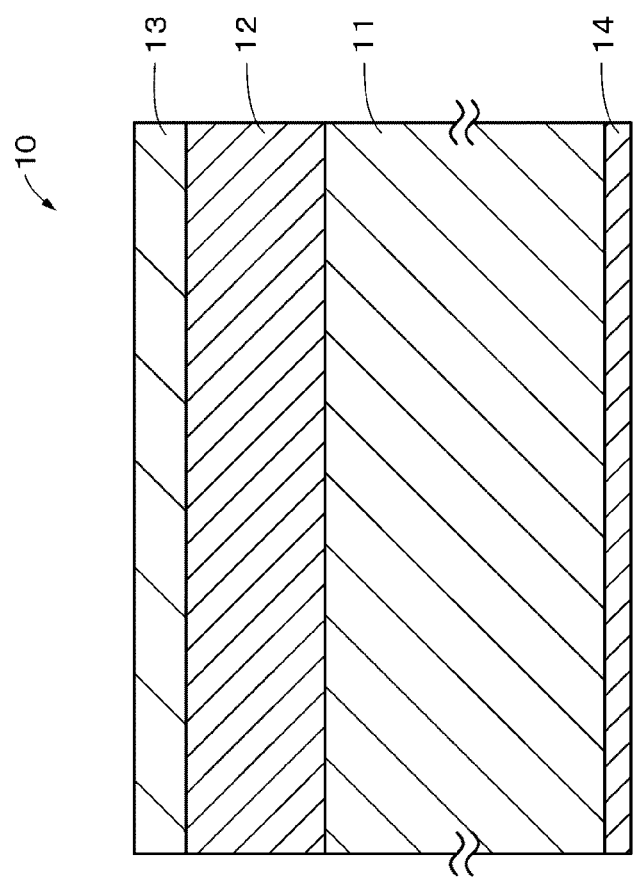
FIG. 1 is a sectional view of a magnetic recording medium according to a first embodiment of the present disclosure.

First, referring to FIG. 1, the configuration of a magnetic recording medium 10 according to a first embodiment will be described. The magnetic recording medium 10 include an elongated base 11, a ground layer 12 provided on a main surface on one side of the base 11, a magnetic layer 13 provided on the ground layer 12, and a back layer 14 provided on a main surface on the other side of the base 11. Note that the ground layer 12 and the back layer 14 are provided as required, and may be absent.

The magnetic recording medium 10 has an elongated tape-like shape, and is made to run in its longitudinal direction at the time of recording or reproduction. Note that the surface of the magnetic layer 13 is a surface on which a magnetic head runs. The magnetic recording medium 10 is preferably used on a recording and reproducing apparatus having a ring-type head as a recording head. Note that herein the "perpendicular direction" means a direction perpendicular to the surface of the magnetic recording medium 10 (the thickness direction of the magnetic recording medium 10), and the "longitudinal direction" means the longitudinal direction (running direction) of the magnetic recording medium 10.

(Base)

The base 11 is a nonmagnetic support body that supports the ground layer 12 and the magnetic layer 13. The base 11 has an elongated film-like shape. An upper limit for average thickness of the base 11 is preferably not more than 4.2 µm, more preferably not more than 3.8 µm, and still more preferably not more than 3.4 µm. When the upper limit for the average thickness of the base 11 is not more than 4.2 µm, the recording capacity which can be recorded in one data cartridge can be enhanced as compared to that of a general magnetic recording medium. A lower limit for the average thickness of the base 11 is preferably not less than 3 µm, and more preferably not less than 3.2 µm. When the lower limit for the average thickness of the base 11 is not less than 3 µm, a lowering in the strength of the base 11 can be restrained.

The average thickness of the base 11 can be determined in the following manner. First, the magnetic recording medium 10 with a ½ inch width is prepared, and is cut to a length of 250 mm, to produce a sample. Subsequently, other layers than the base 11 (namely, the ground layer 12, the magnetic layer 13, and the back layer 14) of the sample are removed by a solvent such as MEK (methyl ethyl ketone) or diluted hydrochloric acid. Next, using a laser hologauge manufactured by Mitsutoyo Corporation as a measuring instrument, the thickness of the sample (base 11) is measured at not less than five positions, and the measurements are simply averaged (arithmetic mean), to calculate the average thickness of the base 11. Note that the measuring positions are selected at random from the sample.

The base 11 includes at least one of, for example, polyesters, polyolefins, cellulose derivatives, vinyl resins, or other polymer resins. Where the base 11 includes two or more of the above-mentioned materials, the two or more materials may be mixed, copolymerized or laminated with one another.

The polyesters include at least one of, for example, PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins include at least one of, for example, PE (polyethylene) or PP (polypropylene). The cellulose derivatives include at least one of, for example, cellulose diacetate, cellulose triacetate, CAB (cellulose acetate butyrate), or CAP (cellulose acetate propionate). The vinyl resins include at least one of, for example, PVC (polyvinyl chloride) or PVDC (polyvinylidene chloride).

The other polymer resins include at least one of, for example, PA (polyamides, nylons), aromatic PC (aromatic polyamides, aramides), PI (polyimides), aromatic PI (aromatic polyimides), PAI (poly amide-polyimides), aromatic PAI (aromatic polyamide-polyimides), PBC (polybenzoxazole, Zylon (registered trademark)), polyethers, PEK (polyether ketone), polyether-esters, PES (polyether sulfone), PEI (polyether imides), PSF (polysulfone), PPS (polyphenylene sulfide), PC (polycarbonate), PAE (polyarylates), or PU (polyurethane).

(Magnetic Layer)

The magnetic layer 13 is a recording layer for recording signals. The magnetic layer 13 includes, for example, a magnetic powder and a binder. The magnetic layer 13 may further include at least one of additive selected from among a lubricant, an antistatic agent, an abrasive, a curing agent, a rust-preventive agent, nonmagnetic reinforcing particles and the like, as required.

It is preferable for the magnetic layer 13 to preliminarily have a plurality of servo bands SB and a plurality of data band DB, as illustrated in FIG. 2A. The plurality of servo bands SB is provided at regular intervals in the widthwise direction of the magnetic recording medium 10. The data band DB is provided between the adjacent servo bands SB. In the servo bands SB, servo signals for tracking control of the magnetic head are preliminarily written. User data are recorded in the data bands DB.

An upper limit for a proportion $R_S$ $(=(S_{SB}/S)\times100)$ of a total area $S_{SB}$ of the servo band SB to an area S of the surface of the magnetic layer 13 is preferably not more than 4.0%, more preferably not more than 3.0%, and still more preferably not more than 2.0%, from the viewpoint of securing a high recording capacity. On the other hand, a lower limit for the proportion $R_S$ of the total area $S_{SB}$ of the servo bands SB to the area S of the surface of the magnetic layer 13 is preferably not less than 0.8%, from the viewpoint of securing five or more servo tracks.

The proportion $R_S$ of the total area $S_{SB}$ of the servo bands SB to the area S of the surface of the magnetic layer 13 can be determined in the following manner. First, the surface of the magnetic layer 13 is observed by use of a magnetic force microscope (MFM), to obtain an MFM image. Subsequently, by using the thus obtained MFM image, a servo band width $W_{SB}$ and the number of the servo bands SB are measured. Next, the proportion $R_S$ is determined from the following formula.

Proportion $R_S[\%]=(((\text{Servo band width } W_{SB})\times(\text{Number of servo bands}))/(\text{Width of magnetic recording medium 10}))\times100$ A lower limit for the number of the servo bands SB is preferably not less than five, more preferably not less than 5+4n (where n is a positive integer), and still more preferably not less than 9+4n. When the number of the servo bands SB is not less than five, influences of size variations in the widthwise direction of the magnetic recording medium 10 on the servo signals can be restrained, and stable recording and reproducing characteristics with less off-track can be secured. An upper limit for the number of the servo bands SB is not particularly restricted, and is, for example, not more than 33.

The number of the servo bands SB can be confirmed in the following manner. First, the surface of the magnetic layer 13 is observed by use of a magnetic force microscope (MFM), to obtain an MFM image. Next, using the thus obtained MFM image, the number of the servo bands SB is counted.

An upper limit for the servo band width $W_{SB}$ is preferably not more than 95 µm, more preferably not more than 60 µm, and still more preferably not more than 30 µm, from the viewpoint of securing a high recording capacity. A lower limit for the servo band width $W_{SB}$ is preferably not less than 10 µm. It is difficult to manufacture a recording head capable of reading servo signals with a servo band width $W_{SB}$ of less than 10 µm.

The width of the servo band width $W_{SB}$ can be determined in the following manner. First, the surface of the magnetic layer 13 is observed by use of a magnetic force microscope (MFM), to obtain an MFM image. Next, using the thus obtained MFM image, the width of the servo band width $W_{SB}$ is measured.

The magnetic layer 13 is configured such that a plurality of data tracks Tk can be formed in the data band DB, as illustrated in FIG. 2B. An upper limit for a data track width W is preferably not more than 3.0 µm, more preferably not more than 1.6 µm, still more preferably not more than 0.95

μm, and particularly preferably not more than 0.51 μm, from the viewpoint of enhancing track recording density and securing a high recording capacity. A lower limit for the data track width W is preferably not less than 0.02 μm, taking magnetic particle size into account.

The magnetic layer 13 is configured to be able to record data in such a manner that a minimum value L of the distance between magnetization inversions and the data track width W are preferably W/L≤200, more preferably W/L≤60, still more preferably W/L≤45, and particularly preferably W/L≤30. If the minimum value L of the distance between magnetization inversions is constant and the minimum value L of the distance between magnetization inversions and the track width W are W/L>200 (that is, if the track width W is large), track recording density is not raised, and it may become impossible to sufficiently secure a recording capacity. If the track width W is constant and the minimum value L of the distance between magnetization inversions and the track width W are W/L>200 (that is, if the minimum value L of the distance between magnetization inversions is small), the bit length is shortened, and, though linear recording density is raised, SNR may be conspicuously worsened because of the influence of spacing loss. Therefore, for restraining worsening of SNR while securing the recording capacity, it is preferably that W/L is in the range of W/L≤60 as aforementioned. It is to be noted, however, that W/L is not limited to the above-mentioned range, and may be in the range of W/L≤23 or W/L≤13. A lower limit for W/L is not particularly limited, and is, for example, 1≤W/L.

The magnetic layer 13 is configured to be able to record data in such a manner that the minimum value of the distance L between magnetization inversions is preferably not more than 50 nm, more preferably not more than 48 nm, still more preferably not more than 44 nm, and particularly preferably not more than 40 nm, from the viewpoint of securing a high recording capacity. A lower limit for the minimum value of the distance L between magnetization inversions is preferably not less than 20 nm, taking magnetic particle size into account.

An upper limit of average thickness of the magnetic layer 13 is preferably not more than 90 nm, particularly preferably not more than 80 nm, still more preferably not more than 70 nm, and further preferably not more than 50 nm. When the upper limit for the average thickness of the magnetic layer 13 is not more than 90 nm, it is ensured that in the case of using a ring-type head as a recording head, magnetization can be recorded uniformly in the thickness direction of the magnetic layer 13, and, therefore, electromagnetic conversion characteristics (for example, C/N (Carrie to Noise Ratio)) can be enhanced.

A lower limit for the average thickness of the magnetic layer 13 is preferably not less than 30 nm, and more preferably not less than 35 nm. When the upper limit for the average thickness of the magnetic layer 13 is not less than 30 nm, it is ensured that in the case of using an MR-type head as a reproduction head, an output can be secured, and, therefore, electromagnetic conversion characteristics (for example, C/N) can be enhanced.

The average thickness of the magnetic layer 13 can be determined in the following manner. First, the magnetic recording medium 10 is thinly processed perpendicularly to its main surface, to produce a specimen, and the section of the specimen is observed under a transmission electron microscope (TEM). The apparatus and observation conditions are set forth below.

Apparatus: TEM (H9000NAR, manufactured by Hitachi, Ltd.)
Acceleration voltage: 300 kV
Magnification: 100,000 times Next, using the thus obtained TEM image, thickness of the magnetic layer 13 is measured at at least 10 or more positions in the longitudinal direction of the magnetic recording medium 10, and the measurements are simply averaged (arithmetic means), to determine the average thickness of the magnetic layer 13. Note that the measuring positions are selected at random from the specimen.

(Magnetic Powder)

The magnetic powder includes a powder of nanoparticles that contain ε iron oxide (hereinafter referred to as "ε iron oxide particles"). The ε iron oxide particles are hard magnetic particles capable of obtaining a high coercive force notwithstanding particulate in form. The ε iron oxide contained in the ε iron oxide particles preferably has preferential crystalline orientation in a perpendicular direction.

The ε iron oxide particles are spherical or substantially spherical in shape, or are cubic or substantially cubic in shape. Since the ε iron oxide particles have the above-mentioned shape, in the case of using the ε iron oxide particles as magnetic particles, it is possible to reduce the contact surface between the particles in the thickness direction of the magnetic recording medium 10, and to restrain aggregation of the particles, as compared to the case of heptagonal plate-shaped barium ferrite particles as magnetic particles. Therefore, dispersibility of the magnetic powder can be enhanced, and more excellent electromagnetic conversion characteristics (for example, C/N) can be obtained.

Figure 3:
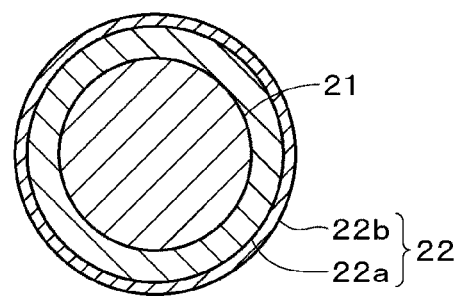
FIG. 3 is a sectional view of a magnetic particle.
Figure 4:
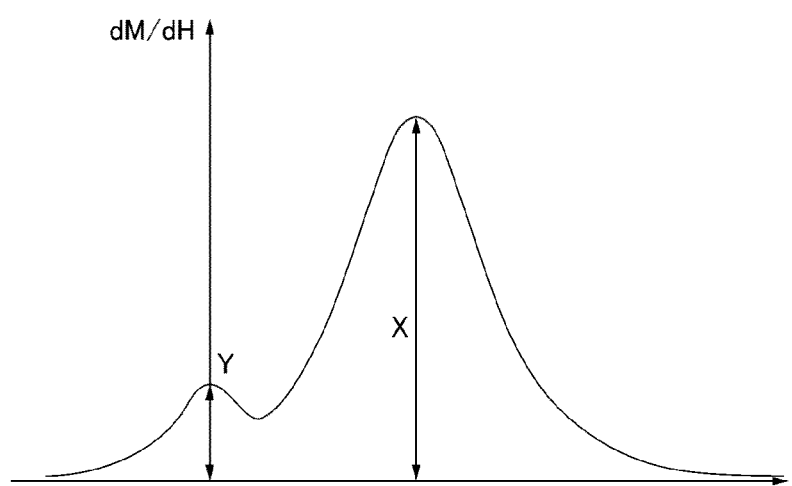
FIG. 4 is a graph depicting an example of an M-H loop.

The ε iron oxide particles have a core-shell type structure. Specifically, as depicted in FIG. 3, the ε iron oxide particles each include a core portion 21, and a shell portion 22 of a two-layer structure provided in the periphery of the core portion 21. The shell portion 22 of the two-layer structure includes a first shell portion 22a provided on the core portion 21, and a second shell portion 22b provided on the first shell portion 22a.

The core portion 21 contains ε iron oxide. The ε iron oxide contained in the core portion 21 is preferably one having an ε—$Fe_2O_3$ crystal as a main phase, and is more preferably one including a single phase of ε—$Fe_2O_3$.

The first shell portion 22a covers at least part of the periphery of the core portion 21. Specifically, the first shell portion 22a may partly cover the periphery of the core portion 21, or may entirely cover the periphery of the core portion 21. It is preferable that the first shell portion 22a entirely covers the surface of the core portion 21, from the viewpoint of securing sufficient exchange coupling between the core portion 21 and the first shell portion 22a, and enhancing magnetic characteristics.

The first shell portion 22a is a so-called soft magnetic layer, and includes a soft magnetic material such as, for example, α-Fe, a Ni—Fe alloy, and a Fe—Si—Al alloy. The α-Fe may be one obtained by reducing the ε iron oxide contained in the core portion 21.

The second shell portion 22b is an oxide coating film as an anti-oxidation layer. The second shell portion 22b includes a iron oxide, aluminum oxide, or silicon oxide. The α iron oxide includes at least one iron oxide of, for example, $Fe_3O_4$, $Fe_2O_3$, and FeO. In the case where the first shell portion 22a contains α-Fe (soft magnetic material), the α iron oxide may be one obtained by oxidizing the α-Fe contained in the first shell portion 22a.

With the ε iron oxide particles having the first shell portions 22a as aforementioned, a coercive force He of the ε iron oxide particles (core shell particles) as a whole can be controlled to a coercive force suitable for recording, while keeping the coercive force Hc of the core portion 21 alone at a high value in order to secure thermal stability. In addition, with the ε iron oxide particles having the second shell portions 22b as aforementioned, it is possible to restrain a situation in which the ε iron oxide particles are exposed to air during or before a manufacturing process of the magnetic recording medium 10, with the result of generation of rust or the like on the particle surfaces and a lowering in the characteristics of the ε iron oxide particles. Accordingly, deterioration of characteristics of the magnetic recording medium 10 can be restrained.

An average particle size (average maximum particle size) of the magnetic powder is preferably not more than 22 nm, more preferably 8 to 22 nm, and still more preferably 12 to 22 nm. In the magnetic recording medium 10, a region of ½ size of a recording wavelength is an actual magnetization region. Therefore, with the average particle size of the magnetic powder set to a value of not more than one half the shortest recording wavelength, a good S/N can be obtained. Accordingly, when the average particle size of the magnetic powder is not more than 22 nm, good electromagnetic conversion characteristics (for example, C/N) can be obtained, in a magnetic recording medium 10 for high recording density (for example, a magnetic recording medium 10 configured to be able to record signals with a shortest recording wavelength of not more than 44 nm). On the other hand, when the average particle size of the magnetic powder is not less than 8 nm, dispersibility of the magnetic powder is more enhanced, and more excellent electromagnetic conversion characteristics (for example, C/N) can be obtained.

An average aspect ratio of the magnetic powder is preferably from 1.0 to 3.0, more preferably from 1.0 to 2.5, still more preferably from 1.0 to 2.1, and particularly preferably from 1.0 to 1.8. When the average aspect ratio of the magnetic powder is in the range of 1.0 to 3.0, aggregation of the magnetic powder can be restrained, and, at the time of setting the magnetic powder in perpendicular orientation in a forming process of the magnetic layer 13, resistance exerted on the magnetic powder can be suppressed. Therefore, the degree of perpendicular orientation of the magnetic powder can be enhanced. Accordingly, electromagnetic conversion characteristics (for example, C/N) can be enhanced.

The average particle size and the average aspect ratio of the magnetic powder are determined in the following manner. First, the magnetic recording medium 10 as an object of measurement is processed by a FIB (Focused Ion Beam) method or the like, to produce a slice, and the section of the slice is observed under a TEM. Next, from the thus picked-up TEM photograph, 50 ε iron oxide particles are selected at random, and a long axial length DL and a short axial length DS of each of the ε iron oxide particles are measured. Here, the long axial length DL means a maximum one of distances between two parallel lines of parallel lines drawn from every angle such as to touch the profile of the ε iron oxide particle (so-called maximum Feret's diameter). On the other hand, the short axial length DS means a maximum one of the lengths of the ε iron oxide particle in directions perpendicular to the long axis of the ε iron oxide particles.

Subsequently, the thus measured long axial lengths DL of the 50 ε iron oxide particles are simply averaged (arithmetic mean), to obtain an average long axial length DLave. The thus obtained average long axial length DLave is made to be the average particle size of the magnetic powder. In addition, the measured short axial lengths DS of the 10 ε iron oxide particles are simply averaged (arithmetic mean), to obtain an average short axial length DSave. Then, an average aspect ratio (DLave/DSave) of the ε iron oxide particles is determined from the average long axial length DLave and the average short axial length DSave.

An average particle volume of the magnetic powder is preferably not more than 5,600 nm$^3$, more preferably 250 to 5,600 nm$^3$, and still more preferably 900 to 5,600 nm$^3$. When the average particle volume of the magnetic powder is not more than 5,600 nm$^3$, an effect which is similar to that obtained in the case where the average particle size of the magnetic powder is not more than 22 nm is obtained. On the other hand, when the average particle volume of the magnetic powder is not less than 250 nm$^3$, an effect which is similar to that obtained in the case where the average particle size of the magnetic powder is not less than 8 nm is obtained.

In the case where the ε iron oxide particles are spherical or substantially spherical in shape, the average particle volume of the magnetic powder is obtained in the following manner. First, the average long axial length DLave is obtained, in the manner similar to that in the method of calculating the average particle size of the magnetic powder. Next, an average volume V of the magnetic powder is obtained by the following formula.

$$V=(\pi/6) \times DLave^3$$

In the case where the ε iron oxide particles are cubic or substantially cubic in shape, the average volume of the magnetic powder is obtained in the following manner. First, the average long axial length DLave is obtained, in the manner similar to that in the method of calculating the average particle size of the magnetic powder. Next, the average volume V of the magnetic powder is obtained by the following formula.

$$V=DLave^3$$

(Binder)

Examples of the binder include thermoplastic resins, thermosetting resins, and reaction-type resins. Examples of the thermoplastic resins include vinyl chloride, vinyl acetate, vinyl chloride-vinyl acetate copolymer, vinyl chloride-vinylidene chloride copolymer, vinyl chloride-acrylonitrile copolymer, acrylate-acrylonitrile copolymer, acrylate-vinyl chloride-vinylidene chloride copolymer, acrylate-acrylonitrile copolymer, acrylate-vinylidene chloride copolymer, methacrylate-vinylidene chloride copolymer, methacrylate-vinyl chloride copolymer, methacrylate-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene-butadiene copolymer, polyurethane resin, polyester resins, amino resin, and synthetic rubber.

Examples of the thermosetting resins include phenolic resins, epoxy resins, polyurethane curing type resin, urea resins, melamine resins, alkyd resins, silicone resins, polyamine resins, and urea-formaldehyde resin.

In all the above-mentioned binders, to enhance a dispersed state of the magnetic powder, there may be introduced a polar functional group such as —SO$_3$M, —OSO$_3$M, —COOM, P=O(OM)$_2$ (where, in the formula, M represents a hydrogen atom or an alkali metal such as lithium, potassium, and sodium), a side chain type amine having a terminal group represented by —NR1R2 or —NR1R2R3+ X$^-$, or a main chain type amine represented by >NR1R2+X$^-$ (where, in the formula, R1, R2, and R3 represent a hydrogen atom or a hydrocarbon group, and X$^-$ represents a halogen ion of fluorine, chlorine, bromine, iodine or the like, an inorganic ion, or an organic ion), or, further, —OH, —SH, —CN, epoxy group or the like. The amount of these polar functional groups introduced into the binder is preferably $10^{-1}$ to $10^{-8}$ mol/g, and more preferably $10^{-2}$ to $10^{-6}$ mol/g.

(Lubricant)

Examples of the lubricant include esters of monobasic fatty acids having 10 to 24 carbon atoms and any of monovalent to hexavalent alcohols having 2 to 12 carbon atoms, mixed esters thereof, difatty acid esters, and trifatty acid esters. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

(Antistatic Agent)

Examples of the antistatic agent include carbon black, natural surfactants, nonionic surfactants, and cationic surfactants.

(Abrasive)

Examples of the abrasive include α-alumina of an a transformation rate of not less than 90%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular a iron oxide prepared by dehydrating and annealing a raw material of magnetic iron oxide, and materials obtained by surface treating these materials with alumina and/or silica as required.

(Curing Agent)

Examples of the curing agent include polyisocyanates. Examples of the polyisocyanates include aromatic polyisocyanates such as adducts of tolylene diisocyanate (TDI) and an active hydrogen compound, and aliphatic polyisocyanates such as adducts of hexamethylene diisocyanate (HMDI) and an active hydrogen compound. These polyisocyanates preferably have a weight average molecular weight in the range of 100 to 3,000.

(Rust-Preventive Agent)

Examples of the rust-preventive agent include phenols, naphthols, quinones, heterocyclic compounds containing a nitrogen atom, heterocyclic compounds containing an oxygen atom, and heterocyclic compounds containing a sulfur atom.

(Nonmagnetic Reinforcing Particles)

Examples of the nonmagnetic reinforcing particles include aluminum oxide (α, β, or γ alumina), chromium oxide, silicon oxide, diamond, garnet, emery, boron nitride, titanium carbide, silicon carbide, titanium carbide, and titanium oxide (rutile type or anatase type titanium oxide).

(Ground Layer)

The ground layer 12 is a nonmagnetic layer containing a nonmagnetic powder and a binder. The ground layer 12 may further contain at least one additive selected from among a lubricant, an antistatic agent, a curing agent, a rust-preventive agent and the like, as required.

The average thickness of the ground layer 12 is preferably 0.6 to 2.0 μm, and more preferably 0.8 to 1.4 μm. Note that the average thickness of the ground layer 12 can be determined in the manner similar to that in the average thickness of the magnetic layer 13. It is to be noted, however, that the magnification of a TEM image is appropriately controlled according to the thickness of the ground layer 12.

(Nonmagnetic Powder)

The nonmagnetic powder includes at least one of an inorganic particle powder or an organic particle powder. The nonmagnetic powder may contain a Fe-based nonmagnetic particles such as hematite (α-$Fe_2O_3$) or goethite (FeO(OH)). Besides, the nonmagnetic powder may contain a carbon powder such as carbon black. Note that one kind of nonmagnetic powder may be used singly, or two or more kinds of nonmagnetic powders may be used in combination. The inorganic particles include, for example, a metal, a metallic oxide, a metallic carbonate, a metallic sulfate, a metallic nitride, a metallic carbide, a metallic sulfide or the like. Examples of the shape of the nonmagnetic powder include various shapes such as an acicular shape, a spherical shape, a cubic shape, and a plate-like shape, but these shapes are not limitative.

(Binder)

The binder is similar to that in the aforementioned magnetic layer 13.

(Additives)

The lubricant, the antistatic agent, the curing agent, and the rust-preventive agent are similar to those in the aforementioned magnetic layer 13.

(Back Layer)

The back layer 14 contains a binder and a nonmagnetic powder. The back layer 14 may further contain at least one additive selected from among a lubricant, a curing agent, an antistatic agent and the like, as required. The binder and the nonmagnetic powder are similar to those in the aforementioned ground layer 12.

The average particle size of the nonmagnetic powder is preferably 10 to 150 nm, and more preferably 15 to 110 nm. The average particle size of the nonmagnetic powder can be determined in the manner similar to that in the average particle size of the magnetic powder. The nonmagnetic powder may contain nonmagnetic powders having two or more particle size distributions.

An upper limit for the average thickness of the back layer 14 is preferably not more than 0.6 μm. When the upper limit for the average thickness of the back layer 14 is not more than 0.6 μm, it is possible, even in the case where the average thickness of the magnetic recording medium 10 is not more than 5.6 μm, to keep the thicknesses of the ground layer 12 and the base 11 large, and, therefore, to maintain running stability of the magnetic recording medium 10 in the recording and reproducing apparatus. A lower limit for the average thickness of the back layer 14 is not particularly limited, and is, for example, not less than 0.2 μm.

The average thickness of the back layer 14 can be determined in the following manner. First, a magnetic recording medium 10 with a ½ inch width is prepared, and is cut to a length of 250 mm, to produce a sample. Next, using a laser hologauge manufactured by Mitsutoyo Corporation as a measuring instrument, the thickness of the sample is measured at five or more points, and the measurements are simply averaged (arithmetic mean), to calculate an average thickness $t_T$ [μm] of the magnetic recording medium 10. Note that the measuring positions are selected at random from the sample. Subsequently, the back layer 14 of the sample is removed by a solvent such as MEK (methyl ethyl ketone) or diluted hydrochloric acid. Thereafter, the thickness of the sample is again measured at five or more points, and the measurements are simply averaged (arithmetic mean), to calculate an average thickness $t_B$ [μm] of the magnetic recording medium 10 deprived of the back layer 14. Note that the measuring positions are selected at random from the sample. Thereafter, the average thickness $t_b$ [μm] of the back layer 14 is determined by the following formula.

$$t_b[\mu m] = t_T[\mu m] - t_B[\mu m]$$

(Average Thickness of Magnetic Recording Medium)

An upper limit for the average thickness (average total thickness) of the magnetic recording medium 10 is preferably not more than 5.6 µm, more preferably not more than 5.0 µm, particularly preferably not more than 4.6 µm, and still more preferably not more than 4.4 µm. When the average thickness of the magnetic recording medium 10 is not more than 5.6 µm, the recording capacity which can be recorded in one data cartridge can be enhanced as compared to those of general magnetic recording media. A lower limit for the average thickness of the magnetic recording medium 10 is not particularly limited, and is, for example, not less than 3.5 µm.

The average thickness of the magnetic recording medium 10 can be determined by the procedure described in the method of determining the average thickness of the back layer 14 above.

(Coercive Force Hc1 in Perpendicular Direction)

An upper limit for a coercive force Hc1 in the perpendicular direction is preferably not more than 3,000 Oe, more preferably not more than 2,900 Oe, and still more preferably not more than 2,850 Oe. That the coercive force Hc1 is great is preferable since the influences of thermal agitation and a diamagnetic field are received with difficulty. On the other hand, if the coercive force Hc1 exceeds 3,000 Oe, it may become difficult to achieve saturation recording at a recording head, whereby a part where recording cannot be achieved is generated and noise is increased, resulting in worsening of electromagnetic conversion characteristics (for example, C/N).

A lower limit for the coercive force Hc1 in the perpendicular direction is preferably not less than 2,200 Oe, more preferably not less than 2,400 Oe, and still more preferably not less than 2,600 Oe. When the coercive force Hc1 is not less than 2,200 Oe, a lowering in electromagnetic conversion characteristics (for example, C/N) under a high-temperature environment due to the influence of thermal agitation and the influence of a diamagnetic field can be restrained.

The above-mentioned coercive force Hc1 can be determined in the following manner. First, a measurement sample is cut out from an elongated magnetic recording medium 10, and, using a vibrating sample magnetometer (VSM), an M-H loop of the measurement sample as a whole is measured in the perpendicular direction (thickness direction) of the measurement sample. Next, coating films (the ground layer 12, the magnetic layer 13, the back layer 14 and the like) are removed by use of acetone, ethanol or the like, while leaving only the base 11, to obtain a background correction sample, and, using the VSM, an M-H loop of the base 11 is measured in the perpendicular direction (thickness direction) of the base 11. Thereafter, the M-H loop of the base 11 is subtracted from the M-H loop of the measurement sample as a whole, to obtain an M-H loop after background correction. From the thus obtained M-H loop, the coercive force Hc1 is determined. Note that the measurements of the M-H loops are each conducted at 25° C. In addition, "diamagnetic field correction" in measuring the M-H loop in the perpendicular direction of the magnetic recording medium 10 is not performed.

(Coercive Force Hc2 in Longitudinal Direction)

An upper limit for a coercive force Hc2 in the longitudinal direction is preferably not more than 2,000 Oe, more preferably not more than 1,900 Oe, and still more preferably not more than 1,800 Oe. When the coercive force Hc2 in the longitudinal direction is not more than 2,000 Oe, magnetization reacts sensitively due to a magnetic field in the perpendicular direction from the recording head, and, therefore, a good record pattern can be formed.

A lower limit for the coercive force Hc2 in the longitudinal direction is preferably not less than 1,000 Oe. When the coercive force Hc2 in the longitudinal direction is not less than 1,000 Oe, demagnetization due to leakage flux from the recording head can be restrained.

The coercive force Hc2 can be determined in the manner similar to that in the coercive force Hc1 in the perpendicular direction, except that the M-H loops of the measurement sample as a whole and the background correction sample are measured in the direction corresponding to the longitudinal direction (running direction) of the magnetic recording medium 10.

(Hc2/Hc1)

A ratio Hc2/Hc1 between the coercive force Hc1 in the perpendicular direction and the coercive force Hc2 in the longitudinal direction satisfies the relation of $Hc2/Hc1 \leq 0.8$, preferably $Hc2/Hc1 \leq 0.75$, more preferably $Hc2/Hc1 \leq 0.7$, still more preferably $Hc2/Hc1 \leq 0.65$, and particularly preferably $Hc2/Hc1 \leq 0.6$. With the coercive forces Hc1 and Hc2 satisfying the relation of $Hc2/Hc1 \leq 0.8$, perpendicular orientation degree of the magnetic powder can be enhanced. Therefore, a magnetization transition width is reduced, and a high-output signal can be obtained at the time of signal reproduction, so that electromagnetic conversion characteristics (for example, C/N) can be enhanced. Note that, as aforementioned, when Hc2 is small, magnetization reacts sensitively due to a magnetic field in the perpendicular direction from the recording head, and, therefore, a good record pattern can be formed.

In the case where the ratio Hc2/Hc1 is $Hc2/Hc1 \leq 0.8$, it is especially effective that the average thickness of the magnetic layer 13 is not more than 90 nm. If the average thickness of the magnetic layer 13 exceeds 90 nm, there is a problem that, in the case of using a ring-type head as a recording head, a lower region (a region on the ground layer 12 side) of the magnetic layer 13 would be magnetized in the longitudinal direction, and it may be impossible to uniformly magnetize the magnetic layer 13 in the thickness direction. Therefore, even if the ratio Hc2/Hc1 is $Hc2/Hc1 \leq 0.8$ (in other words, even if the perpendicular orientation degree of the magnetic powder is enhanced), it may be impossible to enhance electromagnetic conversion characteristics (for example, C/N).

A lower limit for the Hc2/Hc1 is not particularly limited, and, for example, $0.5 \leq Hc2/Hc1$.

Note that Hc2/Hc1 represents the perpendicular orientation degree of the magnetic powder, and the perpendicular orientation degree of the magnetic powder is higher as the Hc2/Hc1 is smaller. In the present embodiment, Hc2/Hc1 is used as an index representing the perpendicular orientation degree of the magnetic powder for the reason which will be described below.

In the past, squareness ratio SQ ($=(Mr/Ms) \times 100$, where Mr (emu) is residual magnetization, and Ms (emu) is saturation magnetization) has generally been used as an index (parameter) for representing the perpendicular orientation degree of a magnetic powder. However, it has been found out by the present inventors that the index of squareness ratio SQ is unsuitable as an index for representing the perpendicular orientation degree of a magnetic powder for the following reasons.

Figure 5:
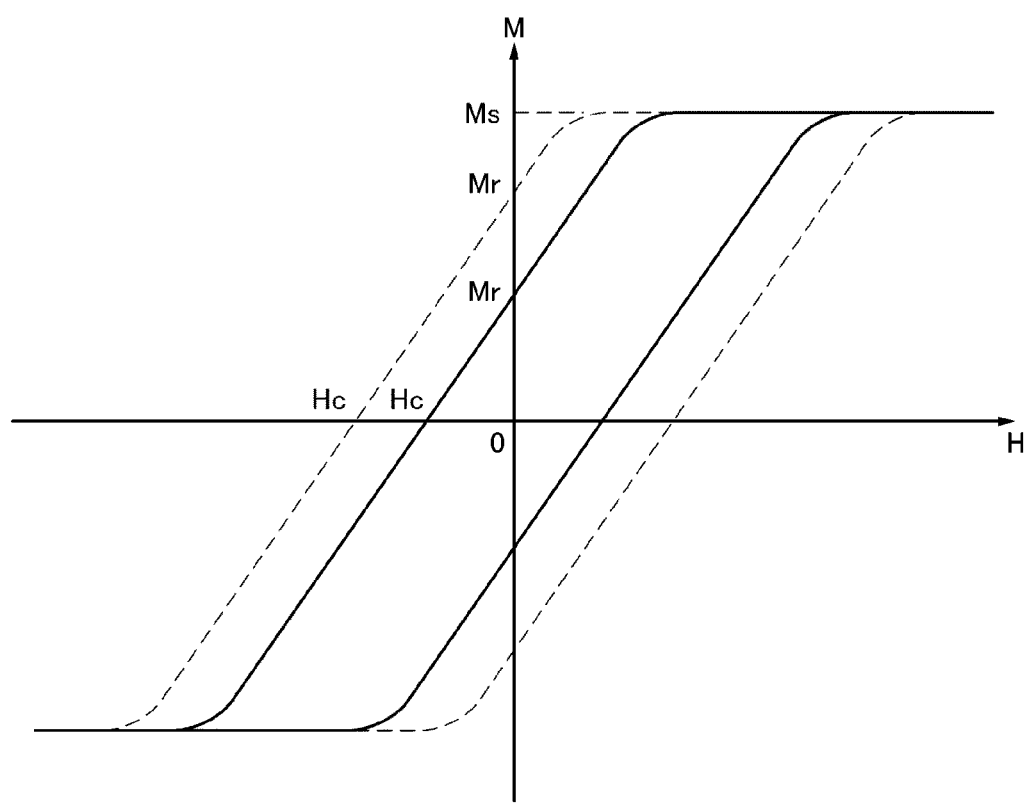
FIG. 5 is a graph depicting an example of an SFD curve.

(1) The squareness ratio SQ would vary depending on the coercive force Hc of a magnetic powder. For example, as depicted in FIG. 5, when the coercive force Hc of a magnetic powder increases, the squareness ratio SQ is also increased apparently.

(2) The squareness ratio SQ is influenced by distortion of the M-H loop due to overdispersion.

In view of this, in the present embodiment, Hc2/Hc1 is used as an index for more suitably representing the orientation degree of a magnetic powder. Since the coercive forces Hc1 and Hc2 vary simply according to the orientation direction of a magnetic powder, Hc2/Hc1 is more suitable as an index for representing the orientation degree of the magnetic powder.

(SFD)

In an SFD (Switching Field Distribution) curve of the magnetic recording medium 10, a peak ratio X/Y between a main peak height X and a height Y of a subpeak in the vicinity of zero magnetic field is preferably not less than 3.0, more preferably not less than 5.0, still more preferably not less than 7.0, particularly preferably not less than 10.0, and most preferably not less than 20.0 (see FIG. 5). When the peak ratio X/Y is not less than 3.0, containment of a large amount of low coercive force components peculiar to ε iron oxide (for example, soft magnetic particles, superparamagnetic particles, etc.) in the magnetic powder in addition to the ε iron oxide particles that contribute to actual recording can be restrained. Therefore, magnetization signals recorded in adjacent tracks can be restrained from being deteriorated due to leakage magnetic field from the recording head, so that more excellent electromagnetic conversion characteristics (for example, C/N) can be obtained. An upper limit for the peak ratio X/Y is not particularly limited, and is, for example, not more than 100.

The peak ratio X/Y can be determined in the following manner. First, in the manner similar to that in the measuring method for the coercive force Hc1 described above, an M-H loop after background correction is obtained. Next, from the thus obtained M-H loop, an SFD curve is calculated. For the calculation of the SFD curve, a program attached to a measuring instrument may be used, or other program may be used. The peak ratio X/Y is calculated, with the absolute value of a point at which the calculated SFD curve crosses a Y axis (dM/dH) made to be "Y," and with the height of a main peak observed in the vicinity of the coercive force Hc1 so called in the M-H loop made to be "X."

(Activation Volume $V_{act}$)

An activation volume $V_{act}$ is preferably not more than 8,000 nm$^3$, more preferably not more than 6,000 nm$^3$, still more preferably not more than 5,000 nm$^3$, particularly preferably not more than 4,000 nm$^3$, and most preferably not more than 3,000 nm$^3$. When the activation volume $V_{act}$ is not more than 8,000 nm$^3$, the magnetic powder is in a good dispersed state; therefore, a bit inversion region can be reduced, and magnetization signals recorded in adjacent tracks can be restrained from being deteriorated due to a leakage magnetic field from the recording head. Accordingly, more excellent electromagnetic conversion characteristics (for example, C/N) can be obtained.

The activation volume $V_{act}$ can be determined by the following formula derived by Street & Woolley:

$$V_{act}(nm^3) = k_B \times T \times X_{irr}/(\mu_0 \times Ms \times S)$$

where $k_B$ is Boltzmann's constant (1.38×10$^{-23}$ J/K), T is temperature (K), $X_{irr}$ is irreversible magnetic susceptibility, $\mu_0$ is permeability of vacuum, S is magnetic viscosity coefficient, and Ms is saturation magnetization (emu/cm$^3$).

The irreversible magnetic susceptibility $X_{irr}$, the saturation magnetization Ms and the magnetic viscosity coefficient S can be determined by use of a VSM in the following manner. Note that the direction of measurement by the VSM is the perpendicular direction. In addition, the measurement by the VSM is applied at 25° C. to a measurement sample cut out from an elongated magnetic recording medium 10. Besides, "diamagnetic field correction" in measuring the M-H loop in the perpendicular direction is not performed.

(Irreversible Magnetic Susceptibility $X_{irr}$)

The irreversible magnetic susceptibility $X_{irr}$ is defined as the inclination of a residual magnetization curve (DCD curve) in the vicinity of a residual coercive force Hr. First, a magnetic field of −1193 kA/m (15 kOe) is applied to the whole of the magnetic recording medium 10, and the magnetic field is returned to zero, to obtain a residual magnetization state. Thereafter, a magnetic field of approximately 15.9 kA/m (200 Oe) in the opposite direction is applied, and the magnetic field is again returned to zero, to measure the amount of residual magnetization. Thereafter, similarly, an operation of applying a magnetic field greater than the previously applied magnetic field by 15.9 kA/m and returning the magnetic field to zero to thereby perform measurement is repeated, and the amount of residual magnetization is plotted against the applied magnetic field, to measure a DCD curve. Using the thus obtained DCD curve, a point at which the magnetization amount becomes zero is made to be a residual coercive force Hr, and the DCD curve is further differentiated, to determine the inclination of the DCD curve at each magnetic field. Of the inclinations of the DCD curve, the inclination in the vicinity of the residual coercive force Hr is the $X_{irr}$.

(Saturation Magnetization Ms)

First, in the manner similar to that in the measuring method for the coercive force Hc1 described above, an M-H loop after background correction is obtained. Next, Ms (emu/cm$^3$) is calculated from the value of saturation magnetization Ms (emu) of the thus obtained M-H loop and the volume (cm$^3$) of the magnetic layer 13 in the measurement sample. Note that the volume of the magnetic layer 13 can be determined by multiplying the area of the measurement sample by the average thickness of the magnetic layer 13. The method for calculating the average thickness of the magnetic layer 13 required for calculating the volume of the magnetic layer 13 is the same as aforementioned.

(Magnetic Viscosity Coefficient S)

First, a magnetic field of −1193 kA/m (15 kOe) is applied to the whole of the magnetic recording medium 10, and the magnetic field is returned to zero, to obtain a residual magnetization state. Thereafter, a magnetic field equivalent to the value of a residual coercive force Hr obtained from the DCD curve is applied in the opposite direction. For 1,000 seconds in a state in which the magnetic field is applied, magnetization amount is measured continuedly at a predetermined time interval. The relation between time t and magnetization amount M(t) thus obtained is checked with the following equation, to calculate a magnetic viscosity coefficient S:

$$M(t) = M0 + S \times ln(t)$$

where M(t) is magnetization amount at time t, M0 is initial magnetization amount, S is magnetic viscosity coefficient, and ln(t) is natural logarithm of time.

1.2 Manufacturing Method for Magnetic Recording Medium

A manufacturing method for the magnetic recording medium 10 having the aforementioned configuration will be described below. First, a nonmagnetic powder and a binder and the like are kneaded and dispersed in a solvent, to prepare a coating material for forming a ground layer. Next, a magnetic powder and a binder and the like are kneaded and dispersed in a solvent, to prepare a coating material for forming a magnetic layer. For preparation of the coating material for forming a magnetic layer and the coating material for forming a ground layer can be performed using, for example, the following solvent, a dispersing apparatus, and a kneading apparatus.

Examples of the solvent to be used in the preparation of the aforementioned coating materials include ketone solvents such as acetone, methyl ethyl ketone, methyl isobutyl ketone, cyclohexanone, etc., alcohol solvents such as methanol, ethanol, propanol, etc., ester solvents such as methyl acetate, ethyl acetate, butyl acetate, propyl acetate, ethyl lactate, ethylene glycol acetate, etc., ether solvents such as diethylene glycol dimethyl ether, 2-ethoxyethanol, tetrahydrofuran, dioxane, etc., aromatic hydrocarbon solvents such as benzene, toluene, xylene, etc., and halogenated hydrocarbon solvents such as methylene chloride, ethylene chloride, carbon tetrachloride, chloroform, chlorobenzene, etc. These may be used either singly or as an appropriate mixture thereof.

As the kneading apparatus to be used for preparation of the aforementioned coating materials, there can be used, for example, kneaders such as a continuous twin screw kneader, a continuous twin screw kneader capable of multistage dilution, a kneader, a pressure kneader, and a roll kneader, but these apparatuses are not particularly limitative. In addition, as the dispersing apparatus for use in preparing the aforementioned coating materials, there can be used, for example, dispersing apparatuses such as a roll mill, a ball mill, a horizontal type sand mill, a vertical type sand mill, a spike mill, a pin mill, a tower mill, a pearl mill (for example, Eirich Co., Ltd. "DCP mill," etc.), a homogenizer, and an ultrasonic dispersing apparatus, but these apparatuses are not particularly restrictive.

Next, the coating material for forming a ground layer is applied to a main surface on one side of abase 11, and is dried, to form a ground layer 12. Subsequently, the coating material for forming a magnetic layer is applied to the ground layer 12, and is dried, to form a magnetic layer 13 on the ground layer 12. Note that in drying, the magnetic powder is subjected to magnetic field orientation in the thickness direction of the base 11 by use of a solenoid coil, for example. In addition, a method may be adopted in which in drying, the magnetic powder is subjected to magnetic field orientation in the running direction (longitudinal direction) of the base 11 by a solenoid coil, for example, and thereafter is subjected to magnetic field orientation in the thickness direction of the base 11. By such a magnetic field orientation treatment, it is possible to lower the ratio Hc2/Hc1. Therefore, it is possible to enhance perpendicular orientation degree of the magnetic powder. After the formation of the magnetic layer 13, a back layer 14 is formed on a main surface on the other side of the base 11. As a result, a magnetic recording medium 10 is obtained.

The ratio Hc2/Hc1 is set to a desired value by, for example, controlling the intensity of a magnetic field applied to the coating film of the coating material for forming the magnetic layer, the concentration of solids in the coating material for forming the magnetic layer, and drying conditions (drying temperature and drying time) for the coating film of the coating material for forming the magnetic layer. The intensity of the magnetic field applied to the coating film is preferably two to three times the coercive force of the magnetic powder. In order to further enhance the ratio Hc2/Hc1, it is preferable to enhance a dispersed state of the magnetic powder in the coating material for forming the magnetic layer. Besides, for further enhancing the ratio Hc2/Hc1, it is also effective to preliminarily magnetize the magnetic powder, at a stage before the coating material for forming the magnetic layer is introduced into an orientation apparatus for subjecting the magnetic powder to magnetic field orientation. Note that the above-mentioned methods for controlling the ratio Hc2/Hc1 may be used either singly or in combination of two or more of them.

Thereafter, the magnetic recording medium 10 obtained is rewound around a large-diameter core, followed by a curing treatment. Finally, the magnetic recording medium 10 is subjected to a calender treatment, followed by cutting to a predetermined width (for example, ½ inch width). By these operations, a desired elongated magnetic recording medium 10 is obtained.

1.3 Configuration of Recording and Reproducing Apparatus

Next, referring to FIG. 6, the configuration of a recording and reproducing apparatus 30 for recording and reproduction on the magnetic recording medium 10 having the aforementioned configuration will be described below.

The recording and reproducing apparatus 30 has a configuration such that a magnetic recording medium cartridge 10A can be mounted therein. Here, for easy description, a case where the recording and reproducing apparatus 30 has a configuration such that one magnetic recording medium cartridge 10A can be mounted therein is described, but the recording and reproducing apparatus 30 has a configuration such that a plurality of magnetic recording medium cartridges 10A can be mounted therein.

The recording and reproducing apparatus 30 is connected to information processing apparatuses such as a server 41 and a personal computer (hereinafter referred to as "PC") 42 through a network 43, and is configured such that data supplied from these information processing apparatuses can be recorded in the magnetic recording medium cartridge 10A.

Figure 6:
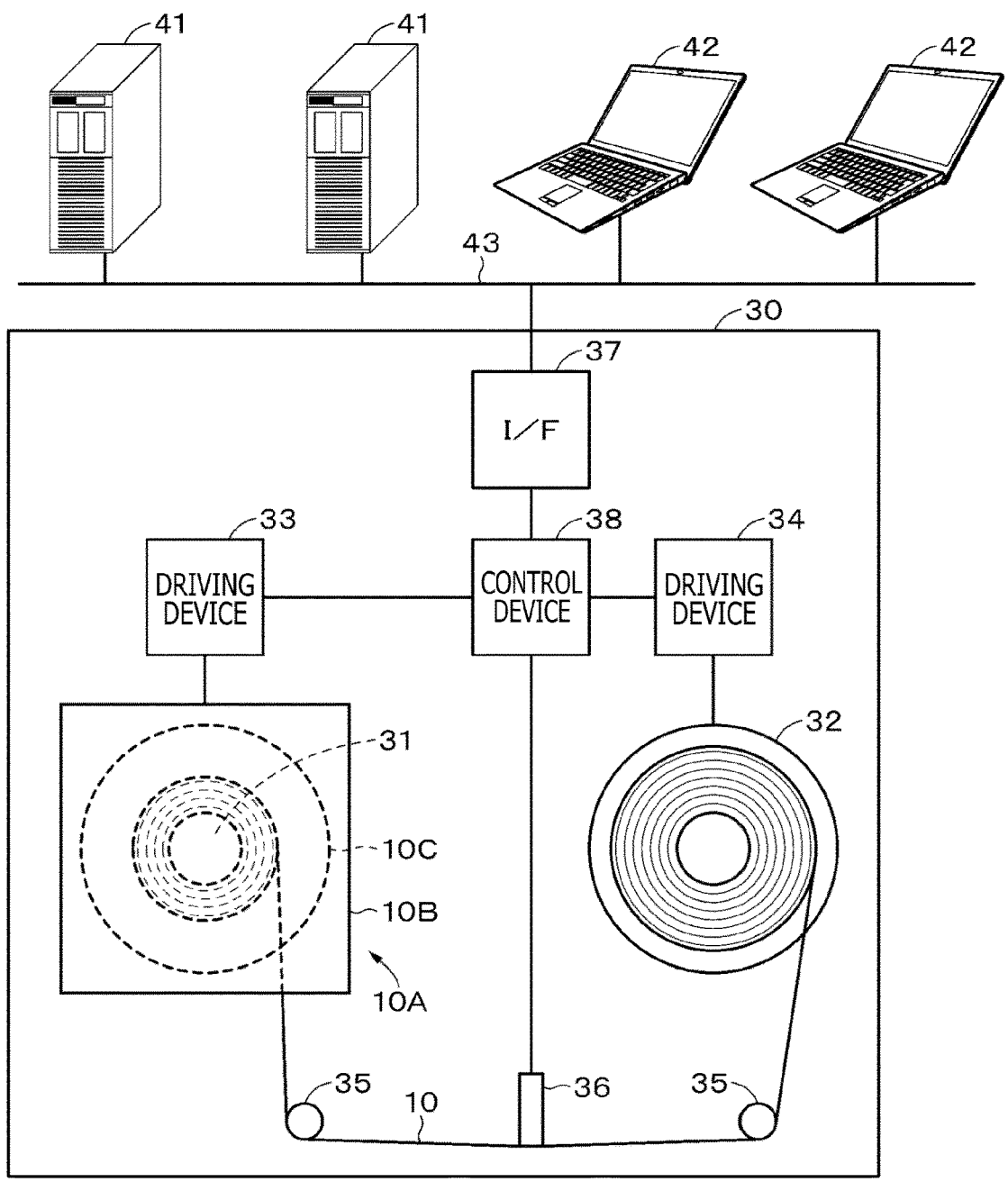
FIG. 6 is a schematic view of a recording and reproducing apparatus.

As illustrated in FIG. 6, the recording and reproducing apparatus 30 includes a spindle 31, a reel 32 on the recording and reproducing apparatus 30 side, a spindle driving device 33, a reel driving device 34, a plurality of guide rollers 35, a head unit 36, a communication interface (hereinafter referred to as I/F) 37, and a control device 38.

The spindle 31 is configured such that the magnetic recording medium cartridge 10A can be mounted thereto. The magnetic recording medium cartridge 10A accords to, for example, the LTO (Linear Tape Open) standard, and rotatably accommodates therein a single reel 10C in which the magnetic recording medium 10 is wound in a cartridge case 10B. On the magnetic recording medium 10, servo patterns in the inverted V-shape are preliminarily recorded as servo signals. The reel 32 is configured such that a tip of the magnetic recording medium 10 paid off from the magnetic recording medium cartridge 10A can be fixed thereto.

The spindle driving device 33 is a device for rotationally driving the spindle 31. The reel driving device 34 is a device for rotationally driving the reel 32. When data are recorded on or reproduced from the magnetic recording medium 10, the spindle driving device 33 and the reel driving device 34 rotationally drive the spindle 31 and the reel 32, to cause the magnetic recording medium 10 to run. The guide rollers 35 are rollers for guiding the running of the magnetic recording medium 10.

The head unit 36 includes a plurality of recording heads for recording data signals on the magnetic recording medium 10, a plurality of reproducing heads for reproducing the data signals recorded on the magnetic recording medium 10, and a plurality of servo heads for reproducing the servo signals recorded on the magnetic recording medium 10. As the recording head, there can be used, for example, a ring-type head, but the kind of the recording head is not limited to this.

The communication I/F 37 is for communication with the information processing apparatuses such as the server 41 and the PC 42, and is connected to the network 43.

The control device 38 controls the whole of the recording and reproducing apparatus 30. For example, the control device 38 records, on the magnetic recording medium 10 by the head unit 36, the data signals supplied from the information processing apparatuses such as the server 41 and the PC 42, in response to a demand from the information processing apparatuses. In addition, the control device 38 reproduces, by the head unit 36, the data signal recorded on the magnetic recording medium 10 and supplies the data signals to the information processing apparatuses such as the server 41 and the PC 42, in response to a demand from the information processing apparatuses.

1.4 Effects

In the magnetic recording medium 10 according to the first embodiment, (1) the average thickness of the magnetic layer 13 is not more than 90 nm, (2) the average aspect ratio of the magnetic powder is from 1.0 to 3.0, (3) the coercive force Hc1 in the perpendicular direction is not more than 3,000 Oe, and (4) the coercive force Hc1 in the perpendicular direction and the coercive force Hc2 in the longitudinal direction satisfy the relation of Hc2/Hc1≤0.8. As a result, electromagnetic conversion characteristics (for example, C/N) can be enhanced.

1.5 Modifications (Modification 1)

Figure 7:
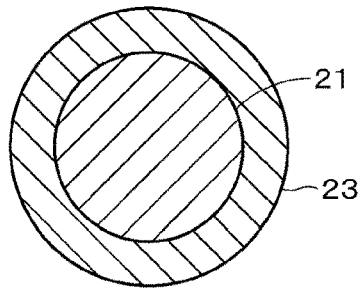
FIG. 7 is a sectional view of a magnetic particle in a modification.

While a case where the ε iron oxide particles each have the shell portion 22 of the two-layer structure has been described in the first embodiment above, the ε iron oxide particles may each have a shell portion 23 of a monolayer structure, as depicted in FIG. 7. In this case, the shell portion 23 has a configuration which is similar to that of the first shell portion 22a. It is to be noted, however, that from the viewpoint of restraining deterioration of characteristics of the ε iron oxide particles, it is preferable for the ε iron oxide particles to each have the shell portion 22 of the two-layer structure, as in the first embodiment above.

(Modification 2)

While a case where the ε iron oxide particles each have the core-shell structure has been described in the first embodiment above, the ε iron oxide particles may include an additive in place of the core-shell structure, and may have the core-shell structure and include an additive. In this case, part of Fe in the ε iron oxide particles is replaced by the additive. With the ε iron oxide particles including the additive, also, the coercive force He of the ε iron oxide particles as a whole can be controlled to a coercive force Hc suitable for recording, and, therefore, a property for easy recording can be enhanced. The additive is a metallic element other than iron, preferably a trivalent metallic element, more preferably at least one of Al, Ga, or In, and still more preferably at least one of Al or Ga.

Specifically, ε iron oxide that contains the additive is an ε—$Fe_{2-x}M_xO_3$ crystal (where M is a metallic element other than iron, preferably a trivalent metallic element, more preferably at least one of Al, Ga, or In, and still more preferably at least one of Al or Ga, with x being, for example, 0<x<1).

(Modification 3)

The magnetic powder may include a powder of hexagonal ferrite-containing nanoparticles (hereinafter referred to as "hexagonal ferrite particles"), in place of the powder of ε iron oxide particles. The hexagonal ferrite particles are, for example, hexagonal plate-like in shape or substantially hexagonal plate-like in shape. The hexagonal ferrite preferably contains at least one of Ba, Sr, Pb, or Ca, and more preferably contains at least one of Ba or Sr. Specifically, the hexagonal ferrite may be, for example, barium ferrite or strontium ferrite. Barium ferrite may further contain at least one of Sr, Pb, or Ca, in addition to Ba. Strontium ferrite may further contain at least one of Ba, Pb, or Ca, in addition to Sr.

More specifically, the hexagonal ferrite has a composition represented by the general formula $MFe_{12}O_{19}$. In the general formula, M is at least one metal of, for example, Ba, Sr, Pb, or Ca, preferably at least one metal of Ba or Sr. M may be a combination of Ba with at least one metal selected from the group consisting of Sr, Pb, and Ca. Besides, M may be a combination of Sr with at least one metal selected from the group consisting of Ba, Pb, and Ca. In the above general formula, part of Fe may be replaced by other metallic element or elements.

In the case where the magnetic powder contains a powder of the hexagonal ferrite particles, the average particle size of the magnetic powder is preferably not more than 30 nm, more preferably 12 to 25 nm, and still more preferably 15 to 22 nm. When the average particle size of the magnetic powder is not more than 30 nm, good electromagnetic conversion characteristics (for example, C/N) can be obtained in the magnetic recording medium 10 for high recording density. On the other hand, when the average particle size of the magnetic powder is not less than 12 nm, dispersibility of the magnetic powder is more enhanced, and more excellent electromagnetic conversion characteristics (for example, C/N) can be obtained. In the case where the magnetic powder contains a powder of hexagonal ferrite particles, the average aspect ratio of the magnetic powder is similar to that in the first embodiment.

Note that the average particle size and the average aspect ratio of the magnetic powder can be determined in the following manner. First, the magnetic recording medium 10 as an object of measurement is processed by an FIB method or the like, to produce a slice, and the section of the slice is observed under a TEM. Next, from a TEM photograph picked up, 50 magnetic powders oriented at an angle of not less than 75 degrees relative to a horizontal direction are selected at random, and a maximum plate thickness DA of each of the magnetic powders is measured. Subsequently, the maximum plate thicknesses DA of the 50 magnetic powders thus measured are simply averaged (arithmetic mean), to obtain an average maximum plate thickness DAave.

Next, a surface of the magnetic layer 13 of the magnetic recording medium 10 is observed under a TEM. Subsequently, from a TEM photograph picked up, 50 magnetic powders are selected at random, and a maximum plate diameter DB of each of the magnetic powders is measured. Here, the maximum plate diameter DB means a maximum one of distances between two parallel lines of parallel lines drawn from every angle such as to touch the profile of the magnetic powder (so-called maximum Feret's diameter). Subsequently, the maximum plate diameters DB of the 50 magnetic powders thus measured are simply averaged (arithmetic mean), to obtain an average maximum plate diameter DBave. The average maximum plate diameter DBave obtained in this way is made to be an average particle size of the magnetic powder. Next, an average aspect ratio (DBave/DAave) of the magnetic powder is determined from the average maximum plate thickness DAave and the average maximum plate diameter DBave.

In the case where the magnetic powder includes a powder of the hexagonal ferrite particles, the average particle volume of the magnetic powder is preferably not more than 5,900 nm³, more preferably 500 to 3,400 nm³, and still more preferably 1,000 to 2,500 nm³. When the average particle volume of the magnetic powder is not more than 5,900 nm³, an effect which is similar to that in the case where the average particle size of the magnetic powder is not more than 30 nm can be obtained. On the other hand, when the average particle volume of the magnetic powder is not less than 500 nm³, an effect which is similar to that in the case where the average particle size of the magnetic powder is not less than 12 nm can be obtained.

Note that the average particle volume of the magnetic powder can be determined in the following manner. First, in the manner similar to that in the calculating method for the average particle size of the magnetic powder described above, the average maximum plate thickness DAave and the average maximum plate diameter DBave are determined. Next, the average particle volume V of the magnetic powder is obtained by the following formula.

(Modification 4)

The magnetic powder may include a powder of nanoparticles that contain Co-containing spinel ferrite (hereinafter referred to as "cobalt ferrite particles"), in place of the powder of ε iron oxide particles. The cobalt ferrite particles preferably have uniaxial anisotropy. The cobalt ferrite particles are, for example, cubic in shape or substantially cubic in shape. The Co-containing spinel ferrite may further contain at least one of Ni, Mn, Al, Cu, or Zn, in addition to Co.

The Co-containing spinel ferrite has, for example, an average composition represented by the following formula (1):

$$Co_xM_yFe_2O_z \quad (1)$$

(In the formula (1), M is at least one metal of, for example, Ni, Mn, Al, Cu, or Zn. x is a value in the range of $0.4 \leq x \leq 1.0$. y is a value in the range of $0 \leq y \leq 0.3$. It is to be noted that x and y satisfy the relation of $(x+y) \leq 1.0$. z is a value in the range of $3 \leq z \leq 4$. Part of Fe may be replaced by other metallic element or elements.)

In the case where the magnetic powder includes a powder of the cobalt ferrite particles, the average particle size of the magnetic powder is preferably not more than 25 nm, and more preferably 8 to 23 nm. When the average particle size of the magnetic powder is not more than 25 nm, good electromagnetic conversion characteristics (for example, C/N) can be obtained, in the magnetic recording medium 10 for high recording density. On the other hand, when the average particle size of the magnetic powder is not less than 8 nm, dispersibility of the magnetic powder is more enhanced, and more excellent electromagnetic conversion characteristics (for example, C/N) can be obtained. In the case where the magnetic powder includes the powder of the cobalt ferrite particles, an average aspect ratio of the magnetic powder is similar to that in the first embodiment above. Besides, the calculating methods for the average particle size and the average aspect ratio of the magnetic powder are similar to those in the first embodiment above.

The average particle volume of the magnetic powder is preferably not more than 15,000 nm³, and more preferably 500 to 12,000 nm³. When the average particle volume of the magnetic powder is not more than 15,000 nm³, an effect which is similar to that in the case where the average particle size of the magnetic powder is not more than 25 nm can be obtained. On the other hand, when the average particle volume of the magnetic powder is not less than 500 nm³, an effect which is similar to that in the case where the average particle size of the magnetic powder is not less than 8 nm can be obtained. Note that the average particle volume of the magnetic powder is similar to the calculating method for the average particle volume of the magnetic powder in the first embodiment above (the calculating method for the average particle volume in the case where the ε iron oxide particles are cubic in shape or substantially cubic in shape).

(Modification 5)

Figure 8:
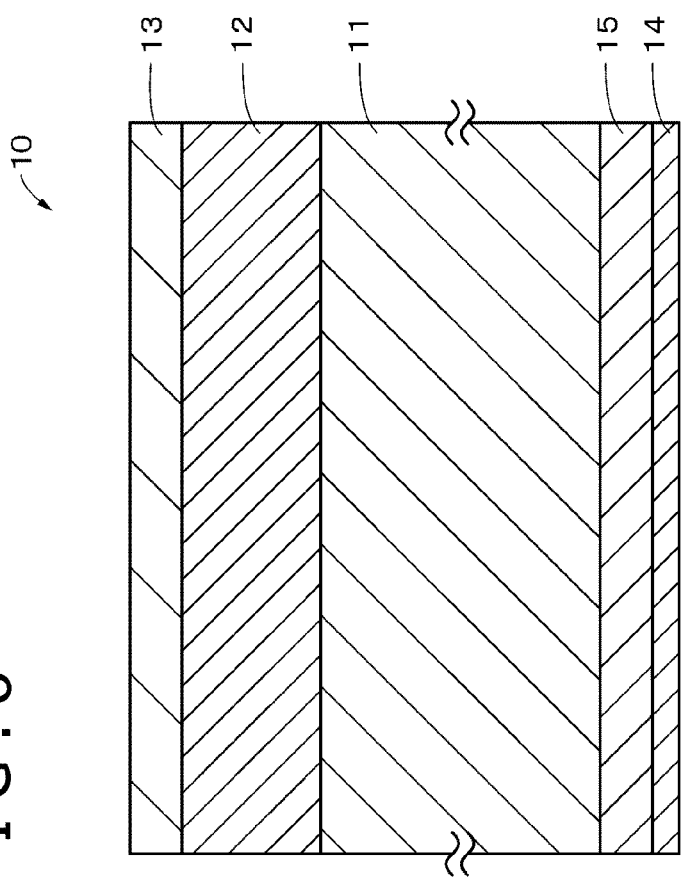
FIG. 8 is a sectional view of a magnetic recording medium in a modification.

The magnetic recording medium 10 may further include a barrier layer 15 provided on a main surface on at least one side of the base 11, as depicted in FIG. 8. The barrier layer 15 is a layer for restraining dimensional variations according to an environment possessed by the base 11. For example, while an example of the causes influencing the dimensional variations may be hygroscopicity of the base 11, the provision of the barrier layer 15 can reduce the rate of penetration of moisture into the base 11. The barrier layer 15 includes, for example, a metal or a metallic oxide. As the metal, there can be used, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta. As the metallic oxide, there can be used, for example, a metallic oxide containing one or more of the above-mentioned metals. More specifically, for example, at least one of $Al_2O_3$, CuO, CoO, $SiO_2$, $Cr_2O_3$, $TiO_2$, $Ta_2O_5$, or $ZrO_2$ can be used. In addition, the barrier layer 15 may include Diamond-Like Carbon (DLC) or diamond or the like.

The average thickness of the barrier layer 15 is preferably 20 to 1,000 nm, and more preferably 50 to 1,000 nm. The average thickness of the barrier layer 15 can be determined in the manner similar to that in the average thickness of the magnetic layer 13. It is to be noted, however, that the magnification of the TEM image is appropriately controlled according to the thickness of the barrier layer 15.

(Modification 6)

The magnetic recording medium 10 according to the first embodiment described above may be used for a library system. In this case, the library system may include a plurality of the recording and reproducing apparatuses 30 according to the first embodiment described above.

2 Second Embodiment

In order to enhance storage capacity per cartridge, it is necessary only to enlarge the overall length of the magnetic recording medium 10. On the other hand, from the viewpoint of restrictions as to the external size of the cartridge, it is preferable to enlarge the overall length of the magnetic recording medium 10 and to reduce the overall thickness of the magnetic recording medium 10. The overall thickness of the magnetic recording medium 10 is attributed mainly to the base 11 and the ground layer (nonmagnetic layer) 12, and thinning of these layer is effective. Since thinning of the base 11 has many problems on the basis of handling in the manufacturing process, thinning of the ground layer 12 is practical. In practice, it is possible to simply reduce the coating thickness of the ground layer 12; however, from the relationship between the particle size of the nonmagnetic particles contained in the ground layer 12 and the coating thickness, surface properties of the magnetic recording medium 10 may be worsened as the ground layer 12 is reduced in thickness. In order to solve such a problem, it is preferable to set the particle size (volume) of the nonmagnetic particles to or below a predetermined value.

The surface properties of the magnetic recording medium 10 here mean an arithmetic mean roughness Ra of the surface on the magnetic layer 13 side of the magnetic recording medium 10 measured by AFM (Atomic Force-Microscopy). If the arithmetic mean roughness Ra of the surface of the magnetic recording medium 10 exceeds an allowable value, the distance between the magnetic recording medium 10 and a recording and reproducing head element would be too large, and signal quality on the basis of high-density recording and reproduction of signals would be lowered. This problem becomes more conspicuous as the magnetic layer 12 becomes thinner.

In accordance with the present inventors' experiments, the above-mentioned allowable value is approximately 2.0 nm in the case where the thickness of the magnetic layer 13 is not more than 90 nm. In view of this, in the present embodiment, the surface properties of the magnetic recording medium 10 are controlled by setting the average particle volume of the nonmagnetic powder constituting the ground layer 12 to or below a predetermined value, such that the arithmetic mean roughness Ra of the surface of the magnetic recording medium 10 will be not more than 2.0 nm.

The average particle volume of the nonmagnetic powder constituting the ground layer 12 is preferably not more than $2.0 \times 10^{-5}$ μm$^3$, and more preferably not more than $1.0 \times 10^{-5}$ μm$^3$. With the average particle volume of the nonmagnetic powder constituting the ground layer 12 set to or below $2.0 \times 10^{-5}$ μm$^3$, the arithmetic mean roughness Ra of the surface of the magnetic layer 13 having a thickness of not more than 90 nm can be suppressed to or below 2.0 nm, even in the case where the thickness of the ground layer 12 is not more than 1.1 μm. Further, with the average particle volume of the nonmagnetic powder constituting the ground layer 12 set to or below $1.0 \times 10^{-5}$ μm$^3$, the arithmetic mean roughness Ra of the surface of the magnetic layer having a thickness of not more than 90 nm can be more reduced, or the arithmetic mean roughness Ra of the surface of the magnetic layer 13 having a thickness of not more than 90 nm can be suppressed to or below 2.0 nm, even in the case where the thickness of the ground layer 12 is 0.6 to 0.8 μm.

Here, the arithmetic mean roughness Ra can be determined in the following manner. First, the surface of the magnetic layer 13 is observed under an AFM, to obtain an AFM image sized 40 μm by 40 μm. As the AFM, Nano Scope IIIa D3100 manufactured by Digital Instruments, Inc. is used, and, as a cantilever, one made of silicon single crystal is used. Next, the AFM image is divided into 256× 256 (=65,536) measurement points, then height Z(i) (i is measurement point number; i=1 to 65,536) at each measurement point is measured, and the heights Z(i) at the measurement points thus measured are simply averaged (arithmetic mean), to obtain an average height (average surface) Zave (=(Z(1)+Z(2)+ ... +Z(65,536))/65,536). Subsequently, deviation Z"(i) (=Z(i)−Zave) from an average center line at each measurement point is obtained, and an arithmetic mean roughness Ra [nm]((Z"(1)+Z"(2)+ ... +Z"(65,536))/65,536) is calculated.

The average particle volume of the nonmagnetic powder can be determined in the following manner. First, as a sample pre-treatment, slicing by an FIB method (μ-sampling method) is conducted. The slicing is performed in the manner of slicing along the lengthwise direction (longitudinal direction) of the magnetic recording medium 10. The thus obtained slice sample is subjected to section observation using a transmission electron microscope (H-9500, manufactured by Hitachi High-Technologies Corporation) at an acceleration voltage of 300 kV and a total magnification of 250,000 times in such a manner that an observed image covers the range of the base 11 to the magnetic layer 13. In the sectional TEM image thus obtained, an ultrafine electron diffraction method is applied to the particles contained in the ground layer 12, to specify 50 nonmagnetic particles. The electron diffraction is conducted using a transmission electron microscope (JEM-ARM200F, manufactured by JEOL Ltd.) at an acceleration voltage of 200 kV, a camera length of 0.8 μm, and a beam diameter of approximately 1 nm.

Subsequently, using the 50 nonmagnetic particles extracted as above, an average particle volume is determined. First, a long axial length DL and a short axial length DS of each particle are measured. Here, the long axial length DL means a maximum one of distances between two parallel lines of parallel lines drawn from every angle such as to touch the profile of the particle (so-called maximum Feret's diameter). On the other hand, the short axial length DS means a maximum one of the lengths of the magnetic powder in directions orthogonal to the long axis of the magnetic powder. Subsequently, the long axial lengths DL of the 50 particles thus measured are simply averaged (arithmetic mean), to obtain an average long axial length DLave. Then, the average long axial length DLave thus obtained is made to be an average particle size of the nonmagnetic powder. In addition, the short axial lengths DS of the 50 particles thus measured are simply averaged (arithmetic mean), to obtain an average short axial length DSave. Next, using the average long axial length DLave and the average short axial length DSave, an average volume Vave (particle volume) of the nonmagnetic powder is obtained from the following formula.

$$Vave = \pi/6 \times DSave^2 \times DLave$$

Table A indicates an example of particle size of a nonmagnetic powder (Fe-based nonmagnetic particle) having an average particle volume of not more than $2.0 \times 10^{-5}$ μm$^3$. The particles are acicular or spindle-like in shape. The nonmagnetic powder having an average particle volume of not more than $2.0 \times 10^{-5}$ μm$^3$ can be obtained, with an average long axial length in the range of 12 to 110 nm, an average short axial length in the range of 6 to 20 nm, and an average aspect ratio in the range of 1.8 to 6.1.

TABLE A

| Nonmagnetic powder α-Fe$_2$O$_3$ | Average long axial length [nm] | Average short axial length [nm] | Average aspect ratio (Average long axial length/ average short axial length) | Average particle volume [μm$^3$] |
|---|---|---|---|---|
| 1 | 110 | 18 | 6.1 | 1.90E−05 |
| 2 | 74 | 12.9 | 5.7 | 6.50E−06 |
| 3 | 38 | 20 | 1.9 | 8.00E−06 |
| 4 | 24 | 13 | 1.8 | 2.10E−06 |
| 5 | 21 | 11 | 1.9 | 1.30E−06 |
| 6 | 12 | 6 | 2.0 | 2.30E−07 |

Note that in the column of average particle volume in Table A, the expression "AE-B" means $A \times 10^{-B}$.

EXAMPLES

The present disclosure will be specifically described below by way of Examples, but the present disclosure is not limited only to these Examples.

In the present Examples, the average thickness of the base film (base), the average thickness of the magnetic layer, the average thickness of the ground layer, the average thickness of the back layer, the average thickness of the magnetic tape (magnetic recording medium), the average aspect ratio of the magnetic powder, the average particle size of the magnetic powder, the average particle volume of the magnetic powder, the coercive force Hc1 of the magnetic tape in the perpendicular direction, the coercive force Hc2 of the magnetic tape in the longitudinal direction, and the servo band width $W_{SB}$ are those determined by the measuring methods described in the first embodiment above.

In addition, in the present Examples, the average long axial length, the average short axial length, the average aspect ratio, the average particle volume of the nonmagnetic powder, and the arithmetic mean roughness Ra of the surface of the magnetic layer are those determined by the measuring methods described in the second embodiment above.

Examples 1 to 9, Comparative Examples 1 to 6

(Preparing Step of Coating Material for Forming Magnetic Layer)

A coating material for forming a magnetic layer was prepared in the following manner. First, a first composition of the formulation set forth below was kneaded by an extruder. Next, the kneaded first composition and a second composition of the formulation set forth below added thereto were premixed in a stirring tank provided with a disperser. Subsequently, sand mill mixing was further conducted, and a filter treatment is performed, to prepare the coating material for forming the magnetic layer.

(First Composition)
  Magnetic powder: 100 parts by weight
  Vinyl chloride resin (30 wt % cyclohexane solution): 10 parts by weight
  (polymerization degree 300, Mn=10,000, containing 0.07 mmol/g of OSO$_3$K and 0.3 mmol/g of secondary OH as polar groups.)
  Aluminum oxide powder: 5 parts by weight
  (α-Al$_2$O$_3$, average particle diameter 0.2 μm)
  Carbon black: 2 parts by weight
  (Tokai Carbon Co., Ltd.; tradename: Seast TA)
  Note that as the magnetic powder, the one indicated in Table 1 was used.

(Second Composition)
  Vinyl chloride resin: 1.1 parts by weight
  (resin solution: resin content 30 wt %, cyclohexanone 70 wt %)
  n-Butyl stearate: 2 parts by weight
  Methyl ethyl ketone: 121.3 parts by weight
  Toluene: 121.3 parts by weight
  Cyclohexanone: 60.7 parts by weight
  Finally, 4 parts by weight of polyisocyanate (tradename: Coronate L; manufactured by Nippon Polyurethane Industry Co., Ltd.) and 2 parts by weight of myristic acid were added as curing agent to the coating material for forming the magnetic layer prepared as above.

(Preparing Step of Coating Material for Forming Ground Layer)

A coating material for forming a ground layer was prepared in the following manner. First, a third composition of the formulation set forth below was kneaded by an extruder. Next, the kneaded third composition and a fourth composition of the formulation set forth below added thereto were premixed in a stirring tank provided with a disperser. Subsequently, sand mill mixing was further conducted, and a filter treatment was performed, to prepare the coating material for the ground layer.

(Third Composition)
  Acicular iron oxide powder: 100 parts by weight
  (α-Fe$_2$O$_3$ (hematite), average long axial length 0.11 μm, average short axial length 0.018 μm, average aspect ratio 6.1, average particle volume $1.9 \times 10^{-5}$ μm$^3$)
  Vinyl chloride resin: 55.6 parts by weight
  (resin solution: resin content 30 wt %, cyclohexanone 70 wt %)
  Carbon black: 10 parts by weight
  (average particle diameter 20 nm)

(Fourth Composition)
  Polyurethane resin UR8200 (Toyobo Co., Ltd.): 18.5 parts by weight
  n-Butyl stearate: 2 parts by weight
  Methyl ethyl ketone: 108.2 parts by weight
  Toluene: 108.2 parts by weight
  Cyclohexanone: 18.5 parts by weight
  Finally, 4 parts by weight of polyisocyanate (tradename: Coronate L, manufactured by Nippon Polyurethane Industry Co., Ltd.) and 2 parts by weight of myristic acid were added as curing agent to the coating material for forming the ground layer prepared as above.

(Preparing Step of Coating Material for Forming Back Layer)

A coating material for forming a back layer was prepared in the following manner. The raw materials set forth below were mixed in a stirring tank provided with a disperser, followed by a filter treatment, to prepare the coating material for forming the back layer.
  Carbon black (Asahi Co., Ltd.; tradename: #80): 100 parts by weight
  Polyester polyurethane: 100 parts by weight (Nippon Polyurethane Industry Co., Ltd.; tradename: N-2304)

Methyl ethyl ketone: 500 parts by weight
Toluene: 400 parts by weight
Cyclohexanone: 100 parts by weight (Film-Forming Step)

Using the coating materials prepared as aforementioned, a magnetic tape of the medium configuration 1 was produced in the following manner. First, an elongated PEN film (base film) having an average thickness of 4.0 µm was prepared as a support. Next, the coating material for forming the ground layer was applied to a main surface on one side of the PEN film, and was dried, to form a ground layer having an average thickness of 1.0 to 1.1 µm on the main surface on the one side of the PEN film. Subsequently, the coating material for forming the magnetic layer was applied onto the ground layer, and was dried to form a magnetic layer having an average thickness of 60 to 100 nm on the ground layer. Note that at the time of drying the coating material for forming the magnetic layer, the magnetic powder was subjected to magnetic field orientation in the thickness direction of the PEN film by use of a solenoid coil. Specifically, the magnetic powder was subjected once to magnetic field orientation in the running direction (longitudinal direction) of the PEN film by use of the solenoid coil, and was then subjected to magnetic field orientation in the thickness direction of the PEN film. In addition, by controlling the drying conditions (drying temperature and drying time) of the coating material for forming the magnetic layer, the coercive force Hc1 in the perpendicular direction was set to a value of 2,450 to 3,100 Oe, and the coercive force Hc2 in the longitudinal direction was set to a value of 1,820 to 2,080 Oe, with Hc2/Hc1 being equal to a value of from 0.65 to 0.85.

Subsequently, the coating material for forming the back layer was applied to a major surface on the other side of the PEN film formed with the ground layer and the magnetic layer, and was dried, to form a back layer having an average thickness of 0.4 µm. Then, the PEN film formed with the ground layer, the magnetic layer, and the back layer was subjected to a curing treatment. Thereafter, a calender treatment was conducted, to smoothen the surface of the magnetic layer.

(Cutting Step)

The magnetic tape obtained as aforementioned was cut to a width of ½ inch (12.65 mm). By this, an elongated magnetic tape having an average thickness of 5.6 µm was obtained.

(Writing of Servo Signal and Data Signal)

A servo signal and a data signal were written into the elongated magnetic tape obtained as aforementioned. First, the servo signal was written into the magnetic tape by use of a servo writer, to form five servo bands having a servo band width $W_{SB}$ of 96 µm. Note that by the writing of the servo signal, a row of magnetic patterns in the inverted V-shape was formed in each servo band.

Next, using a recording and reproducing apparatus, a data signal was written into data bands between the servo bands. In this instance, the recording and reproducing apparatus was controlled such as to obtain a recording track width W of 2.9 µm and a recording wavelength k of a single recording wavelength of 0.208 µm. Note that the recording wavelength k [nm] of the data signal was set to four times the distance between magnetization inversions, L [nm] (=0.052 µm), upon recording with the shortest recording wavelength (in other words, the shortest recording wavelength is L'=2×L, and the recording wavelength L=(two times of L')). As the recording head, a ring head with a gap length of 0.2 µm was used.

Here, the recording wavelength λ is made to be two times the shortest recording wavelength L' for the following reason. Specifically, in a recording and reproducing system using a short wavelength, an output/noise ratio at the time of recording and reproducing with a recording wavelength of two times the shortest recording wavelength is generally often used as C/N. In addition, C/N at the recording wavelength of two times the shortest recording wavelength is higher than C/N at the shortest recording wavelength in correlation with error rate. Further, in the case where C/N measurement is conducted at the shortest recording wavelength, a situation in which tape noise is hidden behind system noise of the recording and reproducing system and the noise characteristics of the medium are not reflected correctly may be generated, depending on the wavelength characteristics of the recording and reproducing system. Especially, in the case of high linear recording density recording, the noise characteristics of the medium are often not reflected correctly.

The minimum value L of the distance between magnetization inversions and the data track width W were determined in the following manner. First, the surface of the magnetic layer 13 was observed using a magnetic force microscope (MFM), to acquire an MFM image. FIGS. 9A and 9B illustrate an example of the MFM image. Next, from the thus acquired MFM image, the size of a magnetization pattern row in the widthwise direction of the magnetic tape was measured, for use as a track width W [nm]. In addition, the distance between a bright portion and a bright portion or between a dark portion and a dark portion in the longitudinal direction of the magnetic tape was made to be k [nm]. Thereafter, one half of k [nm] was made to be L' [nm], and, further, one half of L' [nm] was made to be L [nm].

Example 10

A magnetic tape of a medium configuration 2 was obtained in the manner similar to that in Example 1, except for the following points. Specifically, the recording and reproducing apparatus was controlled in such a manner as to obtain a recording track width W of 1.5 µm, and a recording wavelength k of a single recording wavelength of 0.192 µm. Note that the recording wavelength k [nm] of the data signal was made to be four times the distance between magnetization inversions, L [nm] (=0.048 µm), at the time of recording with the shortest recording wavelength.

Example 11

A magnetic tape of a medium configuration 3 was obtained in the manner similar to that in Example 2, except for the following points. Specifically, a PEN film having an average thickness of 3.6 µm was used as a support, and the average thickness of the magnetic tape was made to be 5.2 µm. In addition, the recording and reproducing apparatus was controlled in such a manner as to obtain a recording track width W of 0.95 µm, and a recording wavelength k of a single recording wavelength of 0.168 µm. Note that the recording wavelength k [nm] of the data signal was made to be four times the distance between magnetization inversions, L [nm] (=0.042 µm), at the time of recording with the shortest recording wavelength.

Example 12

A magnetic tape of a medium configuration 4 was obtained in the manner similar to that in Example 8, except for the following points. Specifically, a PEN film having an average thickness of 3.6 μm was used as a support, and the average thickness of the magnetic tape was made to be 5.2 μm. In addition, nine servo bands having a servo band width $W_{SB}$ of 96 μm were formed. In addition, the recording and reproducing apparatus was controlled in such a manner as to obtain a recording track width W of 0.51 μm, and a recording wavelength k of a single recording wavelength of 0.156 μm. Note that the recording wavelength k [nm] of the data signal was made to be four times the distance between magnetization inversions, L [nm] (=0.039 μm), at the time of recording with the shortest recording wavelength.

Example 13

A magnetic tape of a medium configuration 5 was obtained in the manner similar to that in Example 8, except for the following points. Specifically, a PEN film having an average thickness of 3.1 μm was used as a support, and the average thickness of the magnetic tape was made to be 4.5 μm. In addition, nine servo bands having a servo band width $W_{SB}$ of 96 μm were formed. Besides, the recording and reproducing apparatus was controlled in such a manner as to obtain a recording track width W of 0.83 μm, and a recording wavelength k of a single recording wavelength of 0.156 μm. Note that the recording wavelength k [nm] of the data signal was made to be four times the distance between magnetization inversions, L [nm] (=0.039 μm), at the time of recording with the shortest recording wavelength.

Example 14

A magnetic tape of a medium configuration 6 was obtained in the manner similar to that in Example 9, except for the following points. Specifically, a PEN film having an average thickness of 3.1 μm was used as a support, and the average thickness of the magnetic tape was made to be 4.5 μm. In addition, nine servo bands having a servo band width $W_{SB}$ of 96 μm were formed. Besides, the recording and reproducing apparatus was controlled in such a manner as to obtain a recording track width W of 0.63 μm, and a recording wavelength k of a single recording wavelength of 0.152 μm. Note that the recording wavelength k [nm] of the data signal was made to be four times the distance between magnetization inversions, L [nm] (=0.038 μm), at the time of recording with the shortest recording wavelength.

Example 15

A magnetic tape of a medium configuration 1 was obtained in the manner similar to that in Example 1, except for the following points. Specifically, the coating thickness of a coating material for forming a magnetic layer was controlled, to form a magnetic layer having an average thickness of 90 nm on a ground layer. In addition, dispersion conditions of the coating material for forming the magnetic layer and drying conditions (drying temperature and drying time) of the coating material for forming the magnetic layer were controlled, in such a manner as to set the coercive force Hc1 in the perpendicular direction to 2,990 Oe, and to set the coercive force Hc2 in the longitudinal direction to 1,500 Oe, with Hc2/Hc1=0.50.

Example 16

A magnetic tape of a medium configuration 1 was obtained in the manner similar to that in Example 1, except for the following points. Specifically, drying conditions (drying temperature and drying time) of the coating material for forming the magnetic layer were controlled, in such a manner as to set the coercive force Hc1 in the perpendicular direction to 2,690 Oe, and to set the coercive force Hc2 in the longitudinal direction to 2,150 Oe, with Hc2/Hc1=0.80.

Example 17

A magnetic tape of a medium configuration 1 was obtained in the manner similar to that in Example 6, except for the following points. Specifically, the coating thickness of the coating material for forming the magnetic layer was controlled, to form a magnetic layer having an average thickness of 90 nm on a ground layer. In addition, drying conditions (drying temperature and drying time) of the coating material for forming the magnetic layer were controlled, in such a manner as to set the coercive force Hc1 in the perpendicular direction to 2,900 Oe, and to set the coercive force Hc2 in the longitudinal direction to 1,950 Oe, with Hc2/Hc1=0.67.

(C/N)

First, using a loop tester (manufactured by Microphysics, Inc.), a reproduction signal of the magnetic tape was acquired. Acquisition conditions of the reproduction signal are set forth below.

Head: GMR head
Speed: 2 m/s
Signal: single recording frequency (10 MHz)
Recording current: optimum recording current Next, the reproduction signal was taken in by a spectrum analyzer, a reproduction output value at 10 MHz and an average value of noises at 10 MHz 1 MHz were measured, and the difference between them was made to be C/N. The results are indicated in Table 1, in terms of relative value with the C/N of Comparative Example 1 as 0 dB. Note that when C/N is not less than 1.5 dB, a medium capable of enduring a short wavelength and a narrow track density can be realized.

Table 1 indicates magnetic characteristics and evaluation results of the magnetic tapes of Examples 1 to 17 and Comparative Examples 1 to 6.

TABLE 1

| | | Magnetic powder | | | | | Medium configuration | Ground layer average thickness [μm] | Tape Magnetic layer average thickness [nm] | Tape average thickness [μm] | Hc1 [Oe] | Hc2 [Oe] | Hc2/Hc1 | Ra [nm] | Evaluation results C/N [dB] |
|---|---|---|---|---|---|---|---|---|---|---|---|---|---|---|---|
| | No. | Composition | Particle shape | Average aspect ratio | Average particle size [nm] | Average particle volume [nm³] | | | | | | | | | |
| Example 1 | 1A | $BaFe_{12}O_{19}$ | plate-like | 2.8 | 20.3 | 1950 | 1 | 1.1 | 80 | 5.6 | 2750 | 2000 | 0.73 | 1.9 | 2.0 |
| Example 2 | 2A | $BaFe_{12}O_{19}$ | plate-like | 2.6 | 18.6 | 1600 | 1 | 1.1 | 60 | 5.6 | 2920 | 1920 | 0.66 | 1.8 | 3.8 |
| Example 3 | 3A | $BaFe_{12}O_{19}$ | plate-like | 3 | 21.3 | 2100 | 1 | 1.1 | 80 | 5.6 | 2750 | 2000 | 0.73 | 1.9 | 1.7 |

TABLE 1-continued

| | | Magnetic powder | | | | | Medium configuration | Ground layer average thickness [μm] | Tape Magnetic layer average thickness [nm] | Tape average thickness [μm] | Hc1 [Oe] | Hc2 [Oe] | Hc2/Hc1 | Ra [nm] | Evaluation results C/N [dB] |
|---|---|---|---|---|---|---|---|---|---|---|---|---|---|---|---|
| | No. | Composition | Particle shape | Average aspect ratio | Average particle size [nm] | Average particle volume [nm³] | | | | | | | | | |
| Example 4 | 1A | BaFe₁₂O₁₉ | plate-like | 2.8 | 20.3 | 1950 | 1 | 1.1 | 90 | 5.6 | 2750 | 2000 | 0.73 | 1.9 | 1.6 |
| Example 5 | 4A | BaFe₁₂O₁₉ | plate-like | 2.9 | 20.9 | 2050 | 1 | 1.1 | 80 | 5.6 | 2980 | 2000 | 0.67 | 1.87 | 2.6 |
| Example 6 | 7A | ε-Fe₂O₃ | spherical | 1.3 | 15.7 | 2050 | 1 | 1.1 | 80 | 5.6 | 2850 | 2020 | 0.71 | 1.9 | 2.1 |
| Example 7 | 8A | CoO(Fe₂O₃) | cubic | 1.1 | 12.6 | 2030 | 1 | 1.1 | 80 | 5.6 | 2800 | 2020 | 0.72 | 1.9 | 1.9 |
| Example 8 | 5A | BaFe₁₂O₁₉ | plate-like | 2.3 | 17.0 | 1400 | 1 | 1.1 | 60 | 5.6 | 2550 | 1820 | 0.71 | 1.9 | 3 |
| Example 9 | 6A | BaFe₁₂O₁₉ | plate-like | 2 | 15.0 | 1100 | 1 | 1.1 | 60 | 5.6 | 2500 | 1840 | 0.74 | 1.75 | 3.3 |
| Example 10 | 1A | BaFe₁₂O₁₉ | plate-like | 2.8 | 20.3 | 1950 | 2 | 1.1 | 80 | 5.6 | 2750 | 2000 | 0.73 | 1.9 | 1.6 |
| Example 11 | 2A | BaFe₁₂O₁₉ | plate-like | 2.6 | 18.6 | 1600 | 3 | 1.1 | 60 | 5.2 | 2920 | 1920 | 0.66 | 1.92 | 3.3 |
| Example 12 | 5A | BaFe₁₂O₁₉ | plate-like | 2.3 | 17.0 | 1400 | 4 | 1.1 | 60 | 5.2 | 2550 | 1820 | 0.71 | 1.87 | 2.5 |
| Example 13 | 5A | BaFe₁₂O₁₉ | plate-like | 2.3 | 17.0 | 1400 | 5 | 1.0 | 60 | 4.5 | 2550 | 1820 | 0.71 | 1.85 | 2 |
| Example 14 | 6A | BaFe₁₂O₁₉ | plate-like | 2 | 15.0 | 1100 | 6 | 1.0 | 60 | 4.5 | 2500 | 1840 | 0.74 | 1.87 | 2.3 |
| Example 15 | 1A | BaFe₁₂O₁₉ | plate-like | 2.8 | 20.3 | 1950 | 1 | 1.1 | 90 | 5.6 | 2990 | 1500 | 0.50 | 1.92 | 3.0 |
| Example 16 | 1A | BaFe₁₂O₁₉ | plate-like | 2.8 | 20.3 | 1950 | 1 | 1.1 | 80 | 5.6 | 2690 | 2150 | 0.80 | 1.90 | 1.3 |
| Example 17 | 7A | ε-Fe₂O₃ | spherical | 1.3 | 15.7 | 2050 | 1 | 1.1 | 90 | 5.6 | 2900 | 1950 | 0.67 | 1.9 | 2.5 |
| Comparative Example 1 | 2B | BaFe₁₂O₁₉ | plate-like | 3.5 | 23.6 | 2450 | 1 | 1.1 | 85 | 5.6 | 2820 | 2000 | 0.71 | 1.97 | 0 |
| Comparative Example 2 | 1A | BaFe₁₂O₁₉ | plate-like | 2.8 | 20.3 | 1950 | 1 | 1.1 | 100 | 5.6 | 2750 | 2000 | 0.73 | 1.95 | 1 |
| Comparative Example 3 | 1A | BaFe₁₂O₁₉ | plate-like | 2.8 | 20.3 | 1950 | 1 | 1.1 | 85 | 5.6 | 2500 | 2100 | 0.84 | 1.9 | 0.3 |
| Comparative Example 4 | 9A | BaFe₁₂O₁₉ | plate-like | 3.0 | 21.3 | 2090 | 1 | 1.1 | 80 | 5.6 | 3100 | 2000 | 0.65 | 1.9 | 0.9 |
| Comparative Example 5 | 7A | ε-Fe₂O₃ | spherical | 1.3 | 15.7 | 2050 | 1 | 1.1 | 80 | 5.6 | 2550 | 2080 | 0.82 | 1.9 | 0.7 |
| Comparative Example 6 | 8A | CoO(Fe₂O₃) | cubic | 1.1 | 12.6 | 2030 | 1 | 1.1 | 80 | 5.6 | 2450 | 2080 | 0.85 | 1.9 | 0.6 |

Table 2 indicates the medium configurations adopted for the magnetic tapes of Examples 1 to 17 and Comparative Examples 1 to 6.

TABLE 2

| | Tape configuration | Magnetic tape average thickness [μm] | Number of servo tracks | Base film average thickness [μm] | W/L | W [μm] | L [μm] |
|---|---|---|---|---|---|---|---|
| Medium configuration 1 | Magnetic layer/Ground layer/Base film/Back layer | 5.6 | 5 | 4.0 | 50 | 2.9 | 0.052 |
| Medium configuration 2 | Magnetic layer/Ground layer/Base film/Back layer | 5.6 | 5 | 4.0 | 30 | 1.5 | 0.048 |
| Medium configuration 3 | Magnetic layer/Ground layer/Base film/Back layer | 5.2 | 5 | 3.6 | 23 | 0.95 | 0.042 |
| Medium configuration 4 | Magnetic layer/Ground layer/Base film/Back layer | 5.2 | 9 | 3.6 | 13 | 0.51 | 0.039 |
| Medium configuration 5 | Magnetic layer/Ground layer/Base film/Back layer | 4.5 | 9 | 3.1 | 21 | 0.83 | 0.039 |
| Medium configuration 6 | Magnetic layer/Ground layer/Base film/Back layer | 4.5 | 9 | 3.1 | 16 | 0.63 | 0.038 |

From Tables 1 and 2, the followings are seen.

In Examples 1 to 5, 15, and 16, (1) the average thickness of the magnetic layer is not more than 90 nm, (2) the average aspect ratio of the magnetic powder is 1.0 to 3.0, (3) the coercive force Hc1 in the perpendicular direction is not more than 3,000 Oe, and (4) the coercive force Hc1 in the perpendicular direction and the coercive force Hc2 in the longitudinal direction satisfy the relation of Hc2/Hc1≤0.8. As a result, a good C/N can be obtained.

Also in Examples 6, 7, and 17 in which the ε iron oxide particle powder or the Co-containing spinel ferrite particle powder was used as the magnetic powder, the above configurations (1) to (4) are satisfied, like in Examples 1 to 5 in which the hexagonal ferrite particle powder was used as the magnetic powder, whereby a good C/N can be obtained.

Also in Examples 8 and 9 in which the ultrafine particle powder was used as the magnetic powder, the above configurations (1) to (4) are satisfied, whereby a good C/N can be obtained.

Also in Examples 10 to 14 in which recording density was enhanced as compared to Examples 1 to 9 and 15 to 17, the above configurations (1) to (4) are satisfied, whereby a good C/N can be obtained.

In Comparative Example 1, the average aspect ratio of the magnetic powder is more than 3.0, in other words, the above configuration (2) is not satisfied; therefore, stacking of the magnetic powder occurs, and a good C/N cannot be obtained.

In Comparative Example 2, the average thickness of the magnetic layer is more than 90 nm, in other words, the above configuration (1) is not satisfied; therefore, characteristics at short wavelengths are deteriorated, and a good C/N cannot be obtained.

In Comparative Example 3, Hc2/Hc1 is more than 0.8, in other words, the above configuration (4) is not satisfied; therefore, the perpendicular orientation degree of the magnetic powder is low. Accordingly, a good C/N cannot be obtained.

In Comparative Example 4, the coercive force Hc1 in the perpendicular direction is more than 3,000 Oe, in other words, the above configuration (3) is not satisfied; therefore, it is difficult to achieve saturation recording by the recording head. Accordingly, a good C/N cannot be obtained.

Also in Comparative Examples 5 and 6 in which ε iron oxide or Co-containing spinel ferrite was used as the magnetic powder, a good C/N cannot be obtained, when the above configurations (1) to (4) are not satisfied, like in Comparative Examples 1 to 4 in which hexagonal ferrite was used as the magnetic powder.

Examples 18 to 30, Comparative Examples 7 and 8

Magnetic tapes were obtained in the manner similar to that in Example 1, except that the configurations of the base film (base), the nonmagnetic layer (ground layer), and the magnetic layer were set as set forth in Tables 3 and 4.

(C/N)

The C/N of the magnetic tapes of Examples 18 to 30 and Comparative Examples 7 and 8 was evaluated in the manner similar to that in Examples 1 to 17 and Comparative Examples 1 to 6 above.

Tables 3 and 4 indicate the configurations and evaluation results of the magnetic tapes of Examples 18 to 30 and Comparative Examples 7 and 8.

TABLE 3

| | Magnetic powder | | | | | Nonmagnetic powder | | | | |
|---|---|---|---|---|---|---|---|---|---|---|
| | Magnetic powder | Particle shape | Average aspect ratio | Average particle size [nm] | Average particle volume [nm$^3$] | Kinds | Average long axial length [nm] | Average short axial length [nm] | Average aspect ratio (Average long axial length/Average short axial length) | Average particle volume [μm$^3$] |
| Example 18 | BaFe$_{12}$O$_{19}$ | plate-like | 2.8 | 20.3 | 1950 | 1 | 110 | 18 | 6.1 | 1.90E−05 |
| Example 19 | BaFe$_{12}$O$_{19}$ | plate-like | 2.8 | 20.3 | 1950 | 2 | 74 | 12.9 | 5.7 | 6.50E−06 |
| Example 20 | BaFe$_{12}$O$_{19}$ | plate-like | 2.8 | 20.3 | 1950 | 3 | 38 | 20 | 1.9 | 8.00E−06 |
| Example 21 | BaFe$_{12}$O$_{19}$ | plate-like | 2.8 | 20.3 | 1950 | 4 | 24 | 13 | 1.8 | 2.10E−06 |
| Example 22 | BaFe$_{12}$O$_{19}$ | plate-like | 2.8 | 20.3 | 1950 | 5 | 21 | 11 | 1.9 | 1.30E−06 |
| Example 23 | BaFe$_{12}$O$_{19}$ | plate-like | 2.8 | 20.3 | 1950 | 3 | 38 | 20 | 1.9 | 8.00E−06 |
| Example 24 | BaFe$_{12}$O$_{19}$ | plate-like | 2.8 | 20.3 | 1950 | 4 | 24 | 13 | 1.8 | 2.10E−06 |
| Example 25 | BaFe$_{12}$O$_{19}$ | plate-like | 2.8 | 20.3 | 1950 | 5 | 21 | 11 | 1.9 | 1.30E−06 |
| Example 26 | BaFe$_{12}$O$_{19}$ | plate-like | 3 | 21.0 | 2000 | 1 | 110 | 18 | 6.1 | 1.90E−05 |
| Example 27 | BaFe$_{12}$O$_{19}$ | spherical | 1.1 | 16.0 | 2150 | 1 | 110 | 18 | 6.1 | 1.90E−05 |
| Example 28 | BaFe$_{12}$O$_{19}$ | spherical | 1 | 16.0 | 2150 | 1 | 110 | 18 | 6.1 | 1.90E−05 |
| Example 29 | ε-Fe$_2$O$_3$ | spherical | 1.3 | 15.7 | 2050 | 2 | 74 | 12.9 | 5.7 | 6.50E−06 |
| Example 30 | CoO(Fe$_2$O$_3$) | cubic | 1.7 | 13.0 | 2200 | 1 | 110 | 18 | 6.1 | 1.90E−05 |
| Comparative Example 7 | BaFe$_{12}$O$_{19}$ | plate-like | 2.8 | 20.3 | 1950 | 1 | 0.15 | 0.024 | 6.3 | 4.50E−05 |
| Comparative Example 8 | BaFe$_{12}$O$_{19}$ | plate-like | 2.8 | 20.3 | 1950 | 1 | 110 | 18 | 6.1 | 1.90E−05 |

Note that in the column of average particle volume in Table A, the expression "AE-B" means $A \times 10^{-B}$. In addition, the kinds "1 to 5" of the nonmagnetic powder correspond to the nonmagnetic powders ($\alpha$-$Fe_2O_3$) 1 to 5 set forth in Table A and described in the second embodiment.

TABLE 4

| | Tape | | | | | | | | | | | | |
|---|---|---|---|---|---|---|---|---|---|---|---|---|---|
| | Medium configuration | | | | Base film | Ground layer | Magnetic | Back layer | Tape | | | | | Evaluation |
| | Number of servo tracks | W/L | W [μm] | L [μm] | average thickness [μm] | average thickness [μm] | layer average thickness [nm] | average thickness [μm] | average thickness [μm] | Hc1 [Oe] | Hc2 [Oe] | Hc2/ Hc1 | Ra [nm] | results C/N [dB] |
| Example 18 | 5 | 50 | 2.9 | 0.052 | 4.0 | 1.1 | 80 | 0.4 | 5.58 | 2750 | 2000 | 0.73 | 1.9 | 2.0 |
| Example 19 | 5 | 50 | 2.9 | 0.052 | 3.6 | 0.6 | 60 | 0.4 | 4.66 | 2920 | 1920 | 0.66 | 1.82 | 3.8 |
| Example 20 | 5 | 50 | 2.9 | 0.052 | 4.0 | 1.1 | 70 | 0.4 | 5.57 | 2850 | 1960 | 0.66 | 1.7 | 3.0 |
| Example 21 | 5 | 50 | 2.9 | 0.052 | 4.0 | 0.6 | 70 | 0.4 | 5.07 | 2850 | 1960 | 0.66 | 1.62 | 3.0 |
| Example 22 | 5 | 50 | 2.9 | 0.052 | 3.6 | 1.1 | 70 | 0.4 | 5.17 | 2850 | 1960 | 0.66 | 1.6 | 3.0 |
| Example 23 | 5 | 50 | 2.9 | 0.052 | 4.0 | 0.6 | 70 | 0.4 | 5.07 | 2850 | 1960 | 0.66 | 1.79 | 3.0 |
| Example 24 | 5 | 50 | 2.9 | 0.052 | 3.6 | 0.6 | 70 | 0.4 | 4.67 | 2850 | 1960 | 0.66 | 1.65 | 3.0 |
| Example 25 | 5 | 50 | 2.9 | 0.052 | 3.8 | 0.8 | 70 | 0.4 | 5.07 | 2850 | 1960 | 0.66 | 1.68 | 3.0 |
| Example 26 | 5 | 50 | 2.9 | 0.052 | 4.0 | 1.1 | 80 | 0.4 | 5.58 | 2750 | 2000 | 0.73 | 1.9 | 1.7 |
| Example 27 | 5 | 50 | 2.9 | 0.052 | 4.0 | 1.1 | 80 | 0.4 | 5.58 | 2750 | 2000 | 0.73 | 1.9 | 1.6 |
| Example 28 | 5 | 50 | 2.9 | 0.052 | 4.0 | 1.1 | 80 | 0.4 | 5.58 | 2980 | 2000 | 0.67 | 1.9 | 2.6 |
| Example 29 | 5 | 50 | 2.9 | 0.052 | 3.6 | 0.6 | 80 | 0.4 | 4.68 | 2900 | 1950 | 0.67 | 1.9 | 2.4 |
| Example 30 | 5 | 50 | 2.9 | 0.052 | 4.0 | 1.1 | 80 | 0.4 | 5.58 | 2800 | 2020 | 0.72 | 1.9 | 1.9 |
| Comparative Example 7 | 5 | 50 | 2.9 | 0.052 | 4.0 | 1.1 | 80 | 0.4 | 5.58 | 2750 | 2000 | 0.73 | 2.3 | 1.3 |
| Comparative Example 8 | 5 | 50 | 2.9 | 0.052 | 3.6 | 0.5 | 80 | 0.4 | 4.68 | 2750 | 2000 | 0.73 | 2.3 | 1.3 |

From Tables 3 and 4, the followings are seen.

With the average particle volume of the nonmagnetic powder constituting the ground layer set to or below $2.0 \times 10^{-5}$ μm$^3$, the arithmetic mean roughness Ra of the surface of the magnetic layer having a thickness of not more than 90 nm can be suppressed to or below 2.0 nm, even in the case where the thickness of the ground layer is 0.6 to 1.1 μm. Therefore, a good C/N can be obtained.

While the embodiments and their modifications of the present disclosure have been specifically described above, the present disclosure is not limited to the above embodiments and modifications thereof, and various modifications are possible based on the technical thought of the present disclosure.

For instance, the configurations, methods, steps, shapes, materials, numerical values, etc. mentioned in the above embodiments and modifications thereof are merely examples, and other configurations, methods, steps, shapes, materials, numerical values, etc. than the above-mentioned may be used, as required. In addition, the chemical formulas of the compounds and the like are representative ones, and the described valences and the like are not limitative, insofar as the general names of the same compounds are used.

In addition, the configurations, methods, steps, shapes, materials, numerical values, etc. in the above embodiments and modifications thereof can be combined with one another unless departing from the gist of the present disclosure.

Besides, herein, the numerical range expressed using "to" means the range which includes the numerical values described before and after "to" as a minimum value and a maximum value, respectively. In the numerical ranges described at stages herein, the upper limit or lower limit of the numerical range at a certain stage may be replaced by the upper limit or lower limit of the numerical range at other stage. The materials mentioned as examples herein can be used either singly or in combination of two or more of them, unless otherwise specified.

In addition, the present disclosure may take the following configurations.

(1)

A tape-shaped magnetic recording medium, including:

a base;

a nonmagnetic layer that is provided on the base and contains a nonmagnetic powder; and a magnetic layer that is provided on the nonmagnetic layer and contains a magnetic powder, in which the magnetic layer has an average thickness of not more than 90 nm, the magnetic powder has an aspect ratio of from 1.0 to 3.0, a coercive force Hc1 in a perpendicular direction is not more than 2,000 Oe, the coercive force in the perpendicular direction and a coercive force Hc2 in a longitudinal direction satisfy a relation of Hc2/Hc1≤0.8, the nonmagnetic layer has an average thickness of not more than 1.1 μm, and the nonmagnetic powder has an average particle volume of not more than $2.0 \times 10$-μm$^3$.

(2)

The magnetic recording medium as described in the above paragraph (1), in which the magnetic layer has a plurality of servo bands, and a proportion of a total area of the servo bands to an area of a surface of the magnetic layer is not more than 4.0%.

(3)

The magnetic recording medium as described in the above paragraph (2), in which the number of the servo bands is not less than five.

(4)

The magnetic recording medium as described in the above paragraph (2), in which the number of the servo bands is not less than 5+4n (where n is a positive integer).

(5)

The magnetic recording medium as described in any one of the above paragraphs (2) to (4), in which the servo bands have a width of not more than 95 μm.

(6)

The magnetic recording medium as described in any one of the above paragraphs (1) to (5), in which the magnetic layer is configured such that a plurality of data tracks can be formed therein, and the data tracks have a width of not more than 3.0 μm.

(7)

The magnetic recording medium as described in any one of the above paragraphs (1) to (5), in which the magnetic layer can record data in such a manner that a ratio W/L between a minimum value L of a distance between magnetization inversions and a width W of the data tracks satisfies a relation of W/L≤200.

(8)

The magnetic recording medium as described in any one of the above paragraphs (1) to (5), in which the magnetic layer can record data in such a manner that a minimum value of the distance L between magnetization inversions is not more than 48 nm.

(9)

The magnetic recording medium as described in any one of the above paragraphs (1) to (8), in which the coercive force Hc2 in the longitudinal direction is not more than 2,000 Oe.

(10)

The magnetic recording medium as described in any one of the above paragraphs (1) to (9), in which the magnetic recording medium has an average thickness of not more than 5.6 μm.

(11)

The magnetic recording medium as described in any one of the above paragraphs (1) to (10), in which the base has an average thickness of not more than 4.2 μm.

(12)

The magnetic recording medium as described in the above paragraph (1), in which the magnetic recording medium has an average thickness of not more than 5.6 μm, the magnetic layer has a plurality of servo bands, the number of the servo bands is not less than five, and the magnetic layer is configured such that a plurality of data tacks can be formed therein, the data tracks have a width of not more than 1.6 μm, a minimum value of a distance L between magnetization inversions is not more than 50 nm, and a ratio W/L between the minimum value L of the distance between magnetization inversions and a width W of the data track satisfies a relation of W/L≤30.

(13)

The magnetic recording medium as described in any one of the above paragraphs (1) to (12), in which the magnetic powder includes hexagonal ferrite, ε iron oxide, or Co-containing spinel ferrite.

(14)

The magnetic recording medium as described in the above paragraph (13), in which the hexagonal ferrite contains at least one of Ba or Sr, and the ε iron oxide contains at least one of Al or Ga.

(15)

The magnetic recording medium as described in any one of the above paragraphs (1) to (14), in which the magnetic layer has an average thickness of not more than 80 nm.

(16)

The magnetic recording medium as described in any one of the above paragraphs (1) to (15), in which the magnetic layer has an average thickness of not more than 70 nm.

(17)

The magnetic recording medium as described in any one of the above paragraphs (1) to (16), in which the coercive force Hc1 in the perpendicular direction and the coercive force Hc2 in the longitudinal direction satisfy a relation of Hc2/Hc1≤0.7.

(18)

The magnetic recording medium as described in any one of the above paragraphs (1) to (17), in which the coercive force Hc1 in the perpendicular direction is not less than 2,200 Oe.

(19)

The magnetic recording medium as described in any one of the above paragraphs (1) to (18), in which the nonmagnetic powder contains Fe-based nonmagnetic particles.

(20)

The magnetic recording medium as described in the above paragraph (19), in which the Fe-based nonmagnetic particles are hematite ($\alpha$-$Fe_2O_3$).

(21)

The magnetic recording medium as described in any one of the above paragraphs (1) to (20), in which the nonmagnetic powder has an average particle volume of not more than $1.0 \times 10^{-5}$ μm$^3$.

(22)

The magnetic recording medium as described in any one of the above paragraphs (1) to (21), in which a surface of the magnetic layer has an arithmetic mean roughness Ra of not more than 2.0 nm.

REFERENCE SIGNS LIST

10 Magnetic recording medium
10A Magnetic recording medium cartridge
10B Cartridge case
10C Reel
11 Base
12 Ground layer
13 Magnetic layer
14 Back layer
15 Barrier layer
21 Core portion
22 Shell portion
22a First shell portion
22b Second shell portion
30 Recording and reproducing apparatus
31 Spindle
32 Reel
33 Spindle driving device
34 Reel driving device
35 Guide roller
36 Head unit
37 Communication interface
38 Control device
41 Server
42 Personal computer
43 Network

The invention claimed is:

1. A tape-shaped magnetic recording medium, comprising:

a base;

a nonmagnetic layer that is provided on the base and contains a nonmagnetic powder; and a magnetic layer that is provided on the nonmagnetic layer and contains a magnetic powder,
wherein the magnetic layer has an average thickness of not more than 90 nm,
the magnetic powder has an aspect ratio of from 1.0 to 3.0,
a coercive force Hc1 in a perpendicular direction is not more than 3,000 Oe,
the coercive force in the perpendicular direction and a coercive force Hc2 in a longitudinal direction satisfy a relation of Hc2/Hc1≤0.8,
the nonmagnetic layer has an average thickness of not more than 1.1 μm, and
the nonmagnetic powder has an average particle volume of not more than $2.0 \times 10^{-5}$ μm$^3$,
wherein the magnetic layer has a plurality of servo bands, and
a proportion of a total area of the servo bands to an area of a surface of the magnetic layer is not more than 4.0%.

2. The magnetic recording medium according to claim 1, wherein the number of the servo bands is not less than five.

3. The magnetic recording medium according to claim 1, wherein the number of the servo bands is not less than 5+4n (where n is a positive integer).

4. The magnetic recording medium according to claim 1, wherein the servo bands have a width of not more than 95 μm.

5. A tape-shaped magnetic recording medium, comprising:
a base;
a nonmagnetic layer that is provided on the base and contains a nonmagnetic powder; and
a magnetic layer that is provided on the nonmagnetic layer and contains a magnetic powder,
wherein the magnetic layer has an average thickness of not more than 90 nm,
the magnetic powder has an aspect ratio of from 1.0 to 3.0,
a coercive force Hc1 in a perpendicular direction is not more than 3,000 Oe,
the coercive force in the perpendicular direction and a coercive force Hc2 in a longitudinal direction satisfy a relation of Hc2/Hc1≤0.8,
the nonmagnetic layer has an average thickness of not more than 1.1 μm, and
the nonmagnetic powder has an average particle volume of not more than $2.0 \times 10^{-5}$ μm$^3$,
wherein the magnetic layer is configured such that a plurality of data tracks can be formed therein, and
the data tracks have a width of not more than 3.0 μm.

6. A tape-shaped magnetic recording medium, comprising:
a base;
a nonmagnetic layer that is provided on the base and contains a nonmagnetic powder; and
a magnetic layer that is provided on the nonmagnetic layer and contains a magnetic powder,
wherein the magnetic layer has an average thickness of not more than 90 nm,
the magnetic powder has an aspect ratio of from 1.0 to 3.0,
a coercive force Hc1 in a perpendicular direction is not more than 3,000 Oe,
the coercive force in the perpendicular direction and a coercive force Hc2 in a longitudinal direction satisfy a relation of Hc2/Hc1≤0.8,
the nonmagnetic layer has an average thickness of not more than 1.1 μm, and
the nonmagnetic powder has an average particle volume of not more than $2.0 \times 10^{-5}$ μm$^3$, wherein the magnetic layer can record data in such a manner that a ratio W/L between a minimum value L of a distance between magnetization inversions and a width W of the data tracks satisfies a relation of W/L≤200.

7. A tape-shaped magnetic recording medium, comprising:
a base;
a nonmagnetic layer that is provided on the base and contains a nonmagnetic powder; and
a magnetic layer that is provided on the nonmagnetic layer and contains a magnetic powder,
wherein the magnetic layer has an average thickness of not more than 90 nm,
the magnetic powder has an aspect ratio of from 1.0 to 3.0,
a coercive force Hc1 in a perpendicular direction is not more than 3,000 Oe,
the coercive force in the perpendicular direction and a coercive force Hc2 in a longitudinal direction satisfy a relation of Hc2/Hc1≤0.8,
the nonmagnetic layer has an average thickness of not more than 1.1 μm, and
the nonmagnetic powder has an average particle volume of not more than $2.0 \times 10^{-5}$ μm$^3$, wherein the magnetic layer can record data in such a manner that a minimum value L of a distance between magnetization inversions is not more than 48 nm.

8. The magnetic recording medium according to claim 1, wherein the coercive force Hc2 in the longitudinal direction is not more than 2,000 Oe.

9. The magnetic recording medium according to claim 1, wherein the magnetic recording medium has an average thickness of not more than 5.6 μm.

10. The magnetic recording medium according to claim 1, wherein the base has an average thickness of not more than 4.2 μm.

11. A tape-shaped magnetic recording medium, comprising:
a base;
a nonmagnetic layer that is provided on the base and contains a nonmagnetic powder; and
a magnetic layer that is provided on the nonmagnetic layer and contains a magnetic powder,
wherein the magnetic layer has an average thickness of not more than 90 nm,
the magnetic powder has an aspect ratio of from 1.0 to 3.0,
a coercive force Hc1 in a perpendicular direction is not more than 3,000 Oe,
the coercive force in the perpendicular direction and a coercive force Hc2 in a longitudinal direction satisfy a relation of Hc2/Hc1≤0.8,
the nonmagnetic layer has an average thickness of not more than 1.1 μm, and
the nonmagnetic powder has an average particle volume of not more than $2.0 \times 10^{-5}$ μm$^3$,
wherein the magnetic recording medium has an average thickness of not more than 5.6 μm,
the magnetic layer has a plurality of servo bands, the number of the servo bands is not less than five, and
the magnetic layer is configured such that a plurality of data tacks can be formed therein, the data tracks have a width of not more than 1.6 μm, a minimum value L of a distance between magnetization inversions is not more than 50 nm, and a ratio W/L between the minimum value L of the distance between magnetization inversions and a width W of the data track satisfies a relation of W/L≤30.

12. The magnetic recording medium according to claim 1, wherein the magnetic powder includes hexagonal ferrite, ε iron oxide, or Co-containing spinel ferrite.

13. The magnetic recording medium according to claim 12,
wherein the hexagonal ferrite contains at least one of Ba or Sr, and
the ε iron oxide contains at least one of Al or Ga.

14. The magnetic recording medium according to claim 1, wherein the magnetic layer has an average thickness of not more than 80 nm.

15. The magnetic recording medium according to claim 1, wherein the magnetic layer has an average thickness of not more than 70 nm.

16. The magnetic recording medium according to claim 1, wherein the coercive force Hc1 in the perpendicular direction and the coercive force Hc2 in the longitudinal direction satisfy a relation of Hc2/Hc1≤0.75.

17. The magnetic recording medium according to claim 1, wherein the coercive force Hc1 in the perpendicular direction is not less than 2,200 Oe.

18. The magnetic recording medium according to claim 1, wherein the nonmagnetic powder contains Fe-based nonmagnetic particles.

19. The magnetic recording medium according to claim 18, wherein the Fe-based nonmagnetic particles are hematite ($\alpha$-$Fe_2O_3$).

20. The magnetic recording medium according to claim 1, wherein the nonmagnetic powder has an average particle volume of not more than $1.0\times10^{-5}$ $\mu m^3$.

21. The magnetic recording medium according to claim 1, wherein a surface of the magnetic layer has an arithmetic mean roughness Ra of not more than 2.0 nm.

* * * * *